(12) United States Patent
Granger-Jones et al.

(10) Patent No.: US 7,809,349 B1
(45) Date of Patent: Oct. 5, 2010

(54) RADIO FREQUENCY FILTER USING INTERMEDIATE FREQUENCY IMPEDANCE TRANSLATION

(75) Inventors: Marcus Granger-Jones, Scotts Valley, CA (US); Thomas McKay, Boulder Creek, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 724 days.

(21) Appl. No.: 11/739,725

(22) Filed: Apr. 25, 2007

Related U.S. Application Data

(60) Provisional application No. 60/829,994, filed on Oct. 18, 2006.

(51) Int. Cl.
*H04B 1/16* (2006.01)
*H04B 1/26* (2006.01)

(52) U.S. Cl. .................. 455/338; 455/307; 455/320; 455/339

(58) Field of Classification Search ................ 455/293, 455/313–320, 323–326, 333, 280, 281, 289, 455/307, 338–339
See application file for complete search history.

(56) References Cited

U.S. PATENT DOCUMENTS

| | | | | |
|---|---|---|---|---|
| 5,448,197 A | * | 9/1995 | Sagawa et al. | 327/408 |
| 5,789,963 A | * | 8/1998 | Sakusabe | 327/356 |
| 6,006,080 A | * | 12/1999 | Kato et al. | 455/323 |
| 6,351,632 B1 | * | 2/2002 | Yan et al. | 455/333 |
| 6,901,249 B1 | * | 5/2005 | Kobayashi | 455/333 |
| 7,251,468 B2 | * | 7/2007 | Ruelke et al. | 455/296 |
| 7,437,131 B2 | * | 10/2008 | Wu et al. | 455/127.1 |
| 2003/0064698 A1 | * | 4/2003 | Kim et al. | 455/313 |
| 2005/0064840 A1 | * | 3/2005 | Heydari et al. | 455/323 |
| 2005/0118976 A1 | * | 6/2005 | Murakami et al. | 455/313 |

\* cited by examiner

*Primary Examiner*—Simon D Nguyen
(74) *Attorney, Agent, or Firm*—Withrow & Terranova, P.L.L.C.

(57) ABSTRACT

The present invention is an RF filter that translates impedances of an IF circuit to create a filter with an RF center frequency having the high Q roll-off characteristics of an IF filter. The RF filter is self-aligned with the frequency of an RF local oscillator. The RF filter has an impedance divider, which is formed by coupling an RF impedance circuit to a translated IF impedance circuit. The translated IF impedance circuit includes an RF passive mixer and an IF impedance circuit. The mixer translates the impedance of the IF impedance circuit by mixing an RF input signal with an RF local oscillator signal, which determines the RF center frequency. Filtered RF signals may be provided by the impedance divider. Filtered IF signals may be provided by the IF impedance circuit. To effectively translate and preserve the IF impedance characteristics, the IF impedance circuit presents a high impedance at harmonics of the RF local oscillator signal.

20 Claims, 19 Drawing Sheets

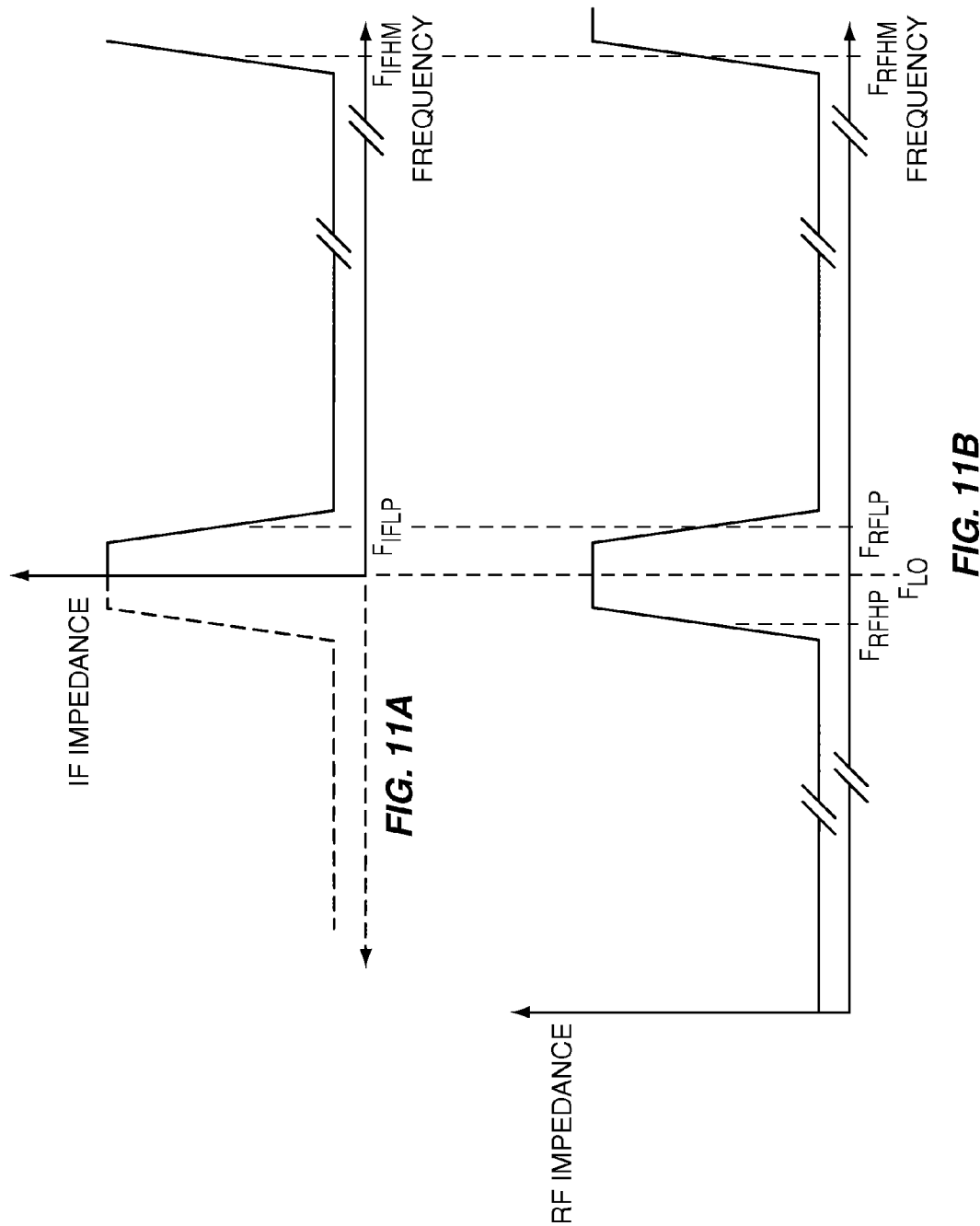

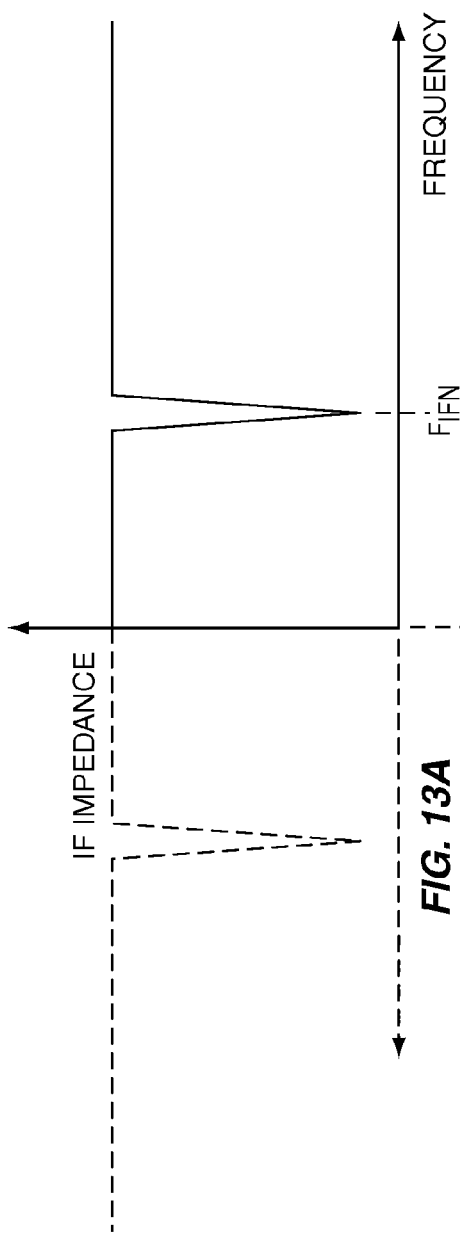
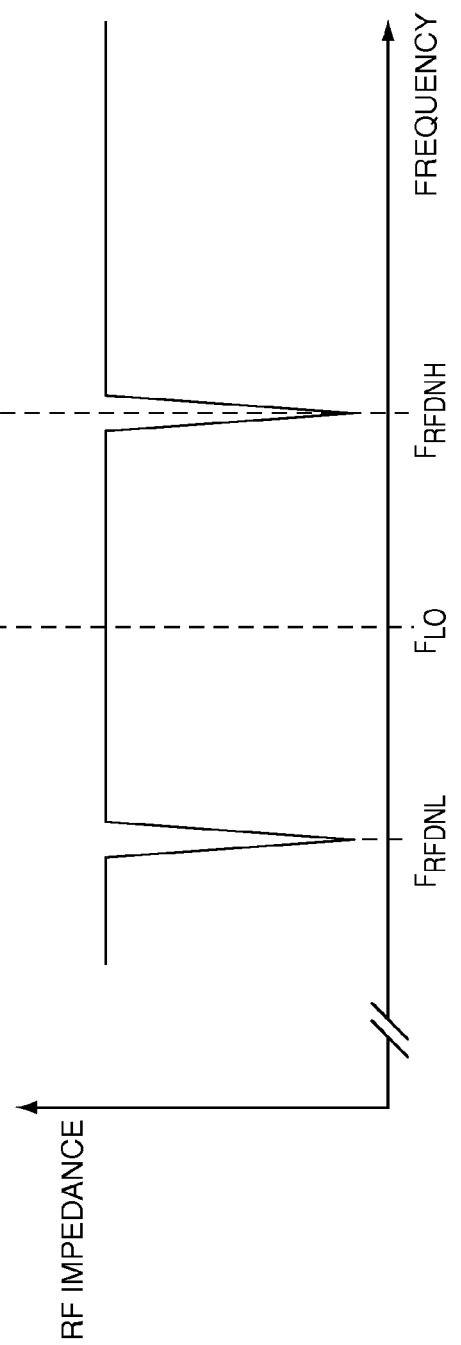
FIG. 13A
FIG. 13B

RADIO FREQUENCY FILTER USING INTERMEDIATE FREQUENCY IMPEDANCE TRANSLATION

This U.S. patent application claims the benefit of provisional patent application Ser. No. 60/829,994, filed Oct. 18, 2006, the disclosure of which is hereby incorporated by reference in its entirety.

FIELD OF THE INVENTION

The present invention relates to radio frequency (RF) filters, which are used in RF communications systems.

BACKGROUND OF THE INVENTION

RF filters are commonly used in RF communications circuits to remove signals at unwanted RF frequencies. An RF receiver may use RF filters to remove unwanted signals that have been received through an antenna, or signals from other circuitry, such as an RF transmitter. An RF transmitter may use RF filters to remove noise from a transmitted signal. A common type of filter circuit is a surface acoustic wave (SAW) filter, which may be used as a bandpass filter. One example of a bandpass filter 10 is shown in FIG. 1. A filter input $F_{IN}$ feeds the bandpass filter 10, which filters out high frequency signals and low frequency signals. A filter output $F_{OUT}$ is provided from the bandpass filter 10. FIG. 2A is a graph showing a constant amplitude signal at all frequencies being applied to the filter input $F_{IN}$. FIG. 2B shows the response of the bandpass filter 10 at the filter output $F_{OUT}$. Frequencies below a high pass filter break frequency $F_{HP}$ are filtered out. Frequencies above a low pass filter break frequency $F_{LP}$, are filtered out. Frequencies between the two break frequencies $F_{HP}$, $F_{LP}$, called the pass band, are allowed to pass through the bandpass filter 10. A center frequency $F_C$ is the average of the high pass filter break frequency $F_{HP}$ and the low pass filter break frequency $F_{LP}$.

RF bandpass filters are typically limited in their roll-off characteristics. It is difficult to produce an RF bandpass filter with a high enough Q to adequately filter out all of the unwanted signals and noise. Q indicates the effectiveness of an RF filter. This is one of the reasons that super-heterodyne receivers are used. In a super-heterodyne receiver, a received RF signal is mixed with an RF local oscillator signal to create an intermediate frequency (IF) signal, the frequency of which is a difference between the frequency of the received RF signal and the frequency of an RF local oscillator signal. Since the IF signal is at a lower frequency, any interfering signals may be filtered out more effectively in the IF section of the receiver than in the RF section. It may be easier to construct a high Q IF filter than a high Q RF filter. Since, by definition, the frequency of the RF local oscillator signal is the center frequency of a desired received RF signal, there is a need for an RF filter that is closely aligned with the frequency of the RF local oscillator signal. As a result, RF bandpass filters may have to be tuned to the desired received center frequency and must be stable in the presence of environmental changes, such as temperature. Thus, there is a need for an RF filter having the high Q roll-off characteristics of an IF filter, which is aligned with the desired received center frequency resulting in improved filtering characteristics.

SUMMARY OF THE INVENTION

The present invention is an RF filter that translates impedances of an IF circuit to create a filter with an RF center frequency having the high Q roll-off characteristics of an IF filter. The RF filter is self-aligned with the frequency of an RF local oscillator. The RF filter has an impedance divider, which is formed by coupling an RF impedance circuit to a translated IF impedance circuit. The translated IF impedance circuit includes an RF passive mixer and an IF impedance circuit. The mixer translates the impedance of the IF impedance circuit by mixing an RF input signal with an RF local oscillator signal, which determines the RF center frequency. Filtered RF signals may be provided by the impedance divider. In addition, filtered IF signals may be provided by the IF impedance circuit. To effectively translate and preserve the IF impedance characteristics, the IF impedance circuit presents a high impedance at harmonics of the RF local oscillator signal. Several different types of RF filters can be created using this technique, including but not limited to RF bandpass filters, RF notch filters, and RF double notch filters. Such filters could be used in RF transmitters, RF receivers, or both. By removing interfering signals in the RF section of an RF receiver instead of the IF section, the RF mixer is spared large amplitudes of interfering signals, which can significantly improve intermodulation performance, relax compression point requirements in the IF section, or both.

In certain embodiments of the present invention, the RF impedance circuit may be series coupled in an RF signal path, and the translated IF impedance circuit may be coupled to ground. The RF passive mixer and the IF impedance circuit may be quadrature to eliminate image load impedances creating image responses as a result of mixing. RF signals, IF signals, or both may include differential signals. The RF passive mixer may be a switching RF passive mixer, which uses the RF local oscillator signal to enable and disable switching elements between an RF input and an IF output. The RF impedance circuit may be provided by an output impedance of an RF amplifier that feeds the translated IF impedance circuit. An RF receiver may use the present invention to remove unwanted signals that have been received through an antenna, or signals from other circuitry, such as an RF transmitter. An RF receiver may use filtered IF signals from the IF impedance circuit. The filtered IF signals may be at any IF frequency, including but not limited to very low IF (VLIF) and direct current (DC) resulting from direct conversion. An RF transmitter may use the present invention to remove noise from a transmitted signal.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 6:
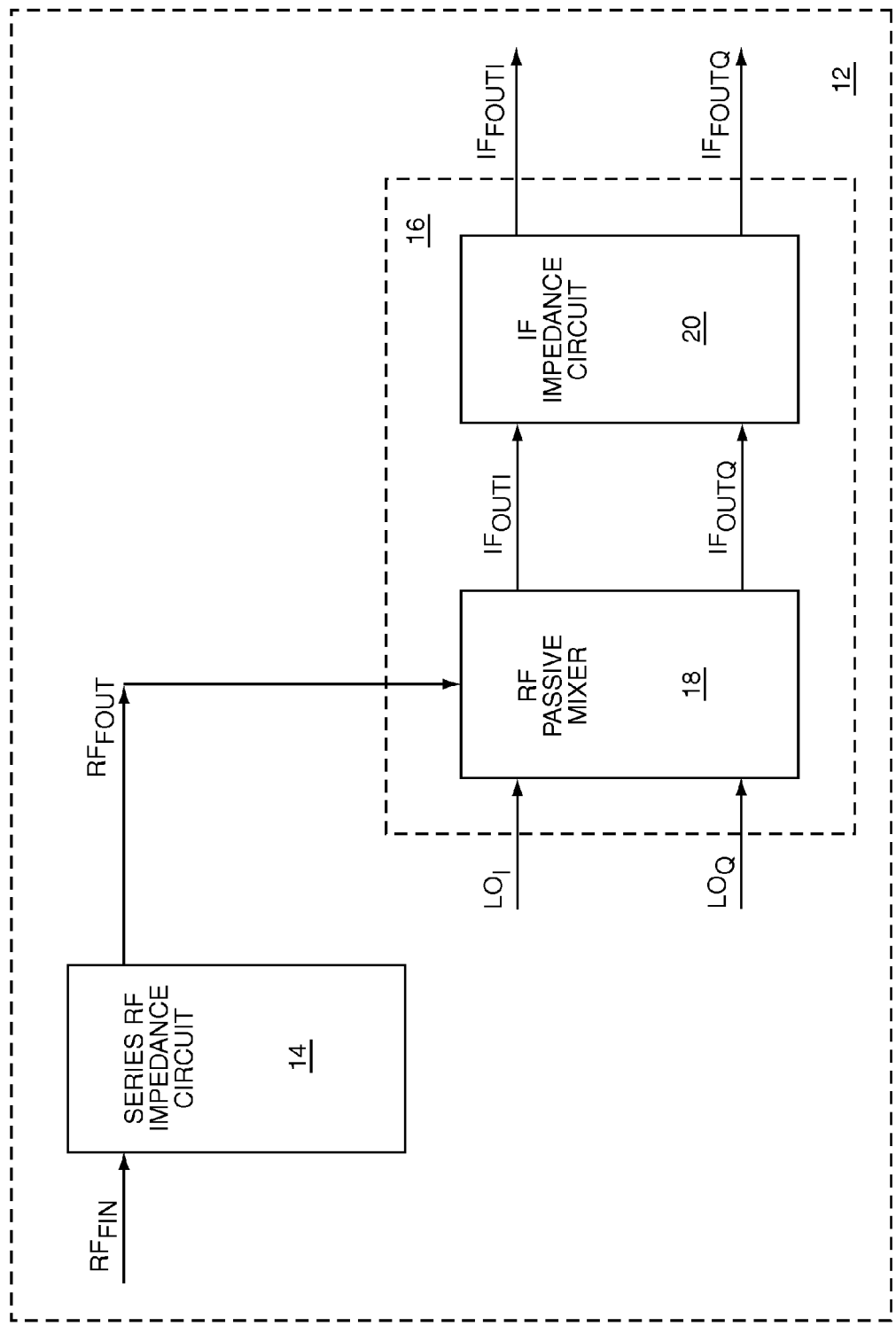
FIG. 6 shows the RF filter of FIG. 3A wherein there is no RF filter output; however, filtered IF outputs are taken from the IF impedance circuit.
Figure 7:
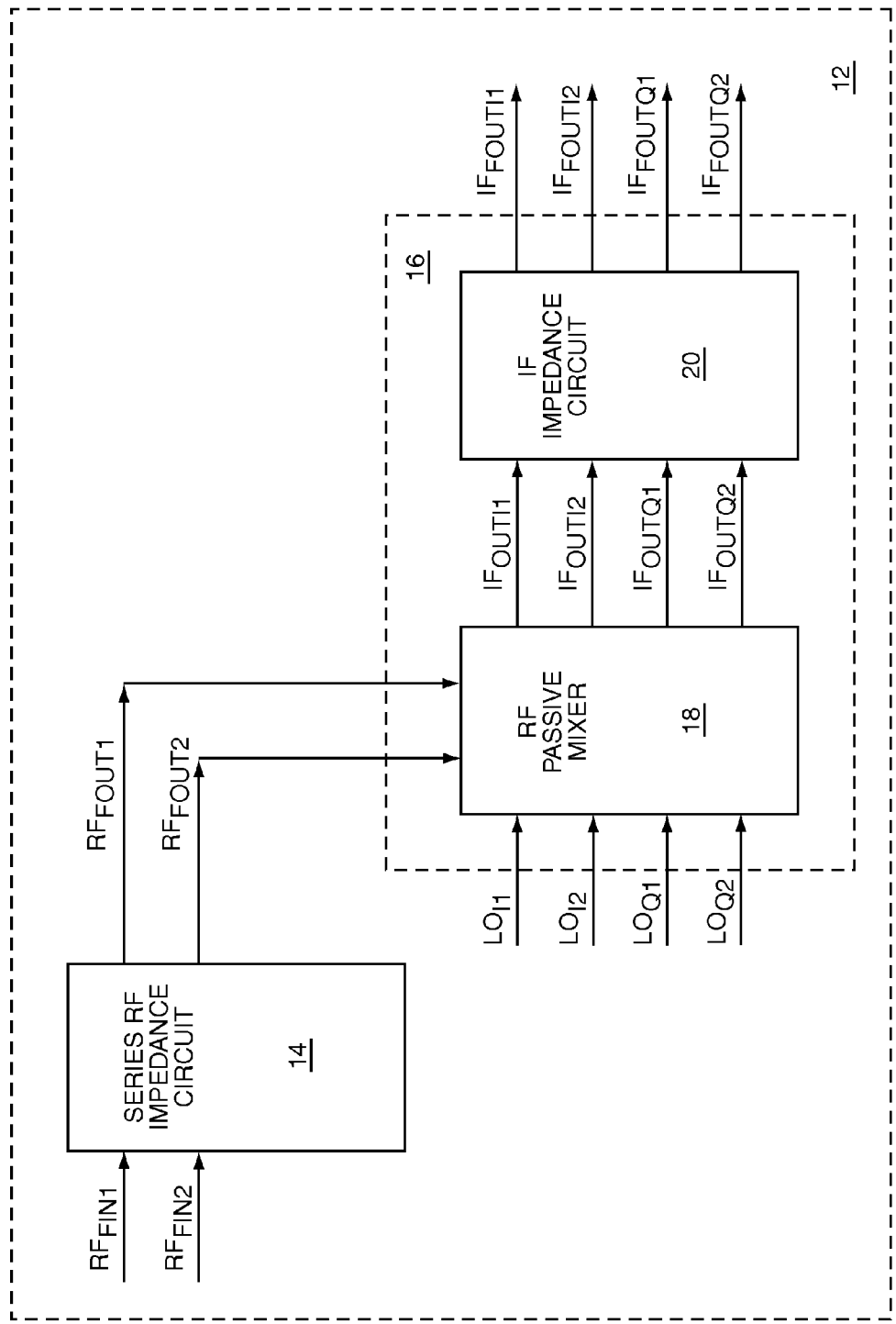

FIG. 7 adds differential signals to the RF filter of FIG. 6.

Figure 8:
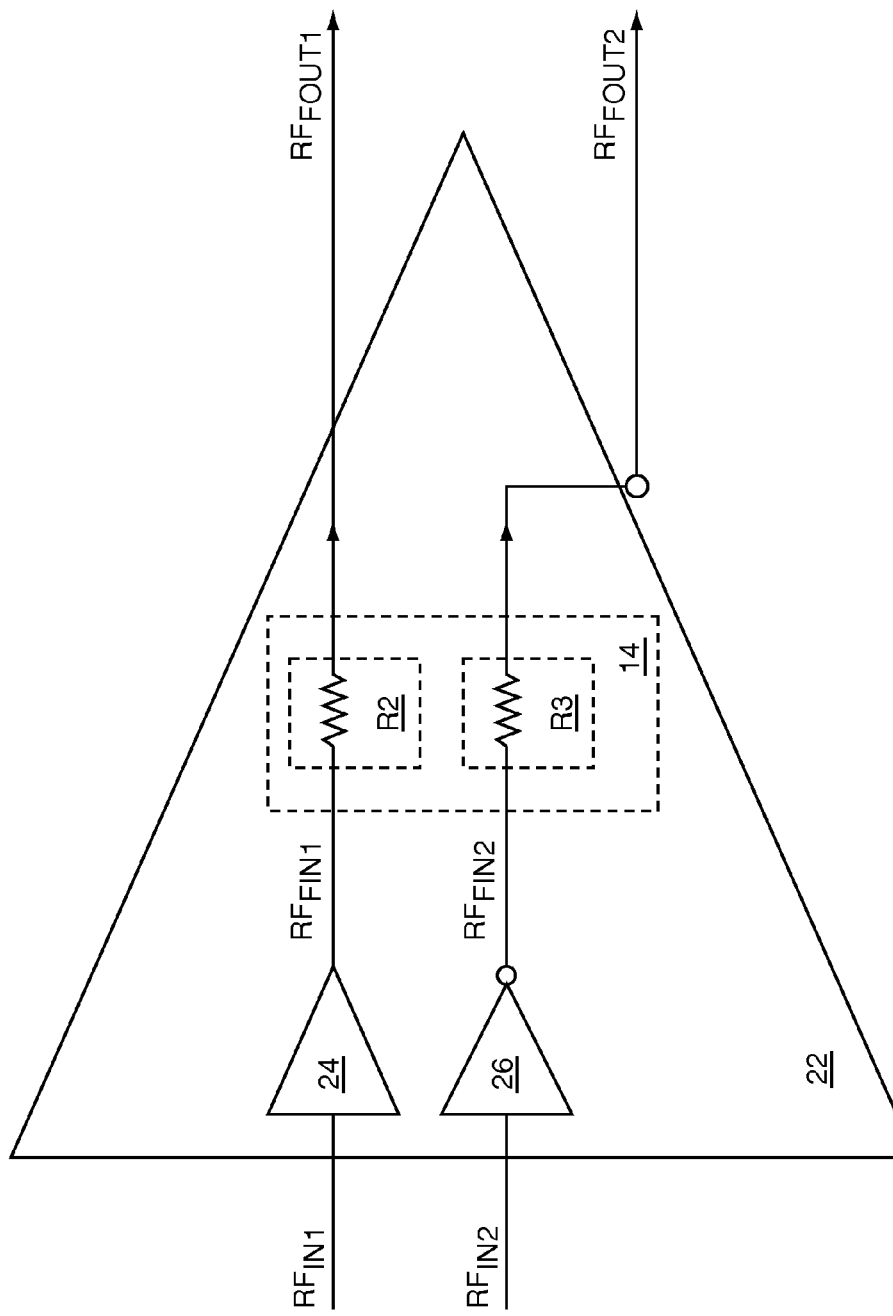

FIG. 8 shows a series RF impedance circuit being provided by an RF amplifier.

Figure 9:
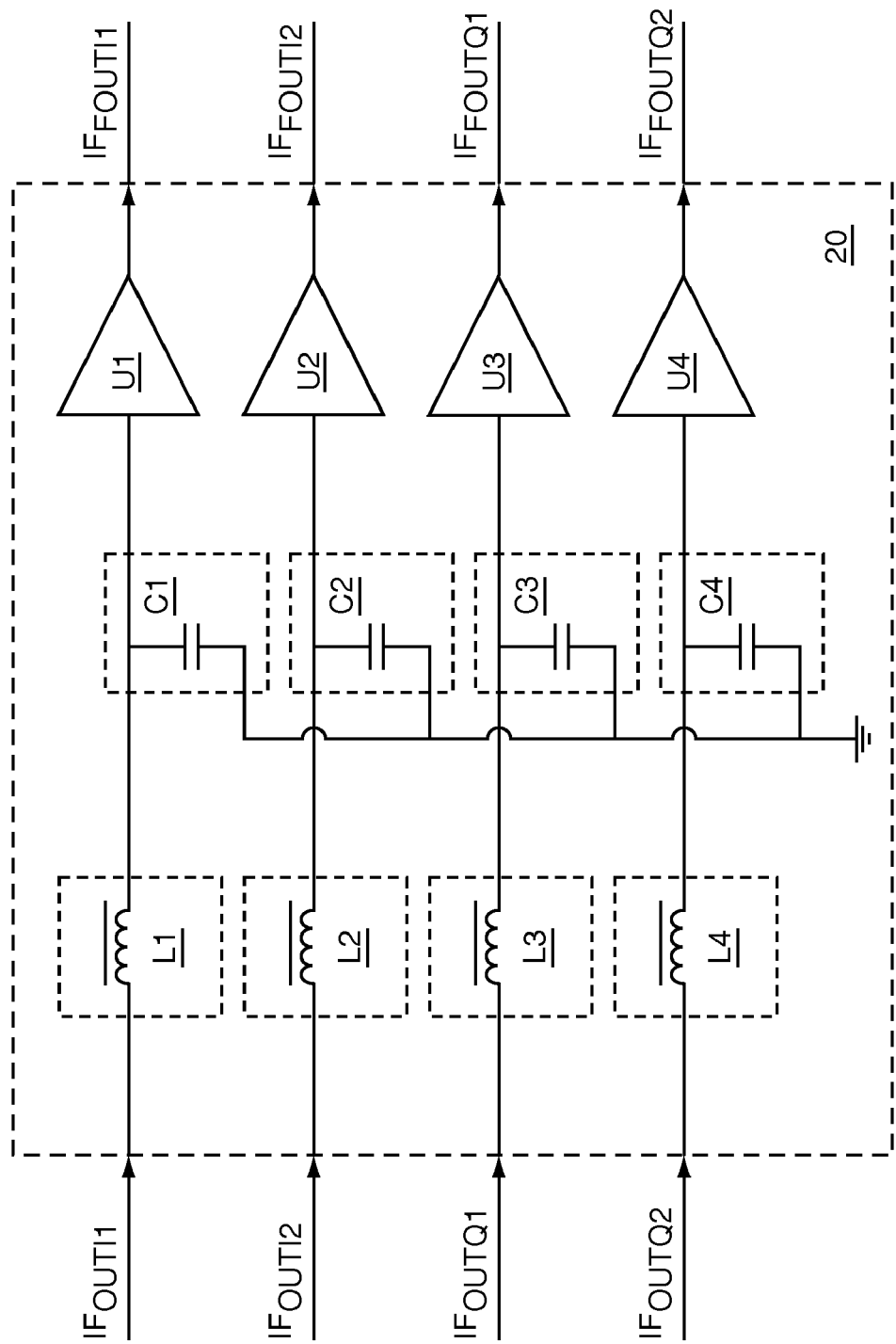

FIG. 9 adds series inductors and capacitors to the IF impedance circuit of FIG. 7.

Figure 10:
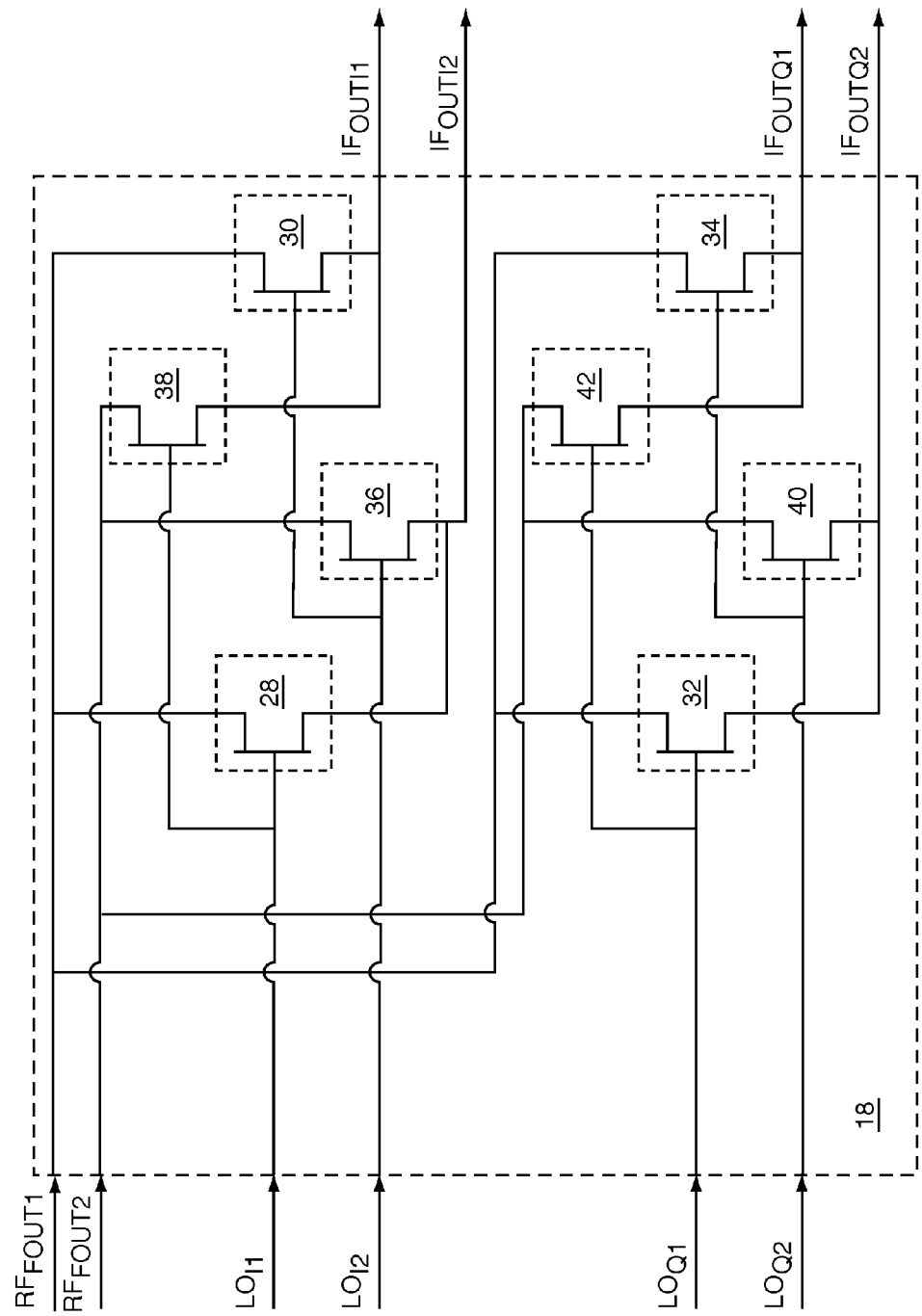

FIG. 10 shows details of the RF passive mixer of FIG. 7.

FIG. 11A is a graph showing the IF impedance of the IF impedance circuit when the present invention is used as an RF bandpass filter.

FIG. 11B is a graph showing the RF impedance, which is the translated IF impedance of the IF impedance circuit of FIG. 11A.

Figure 12A:
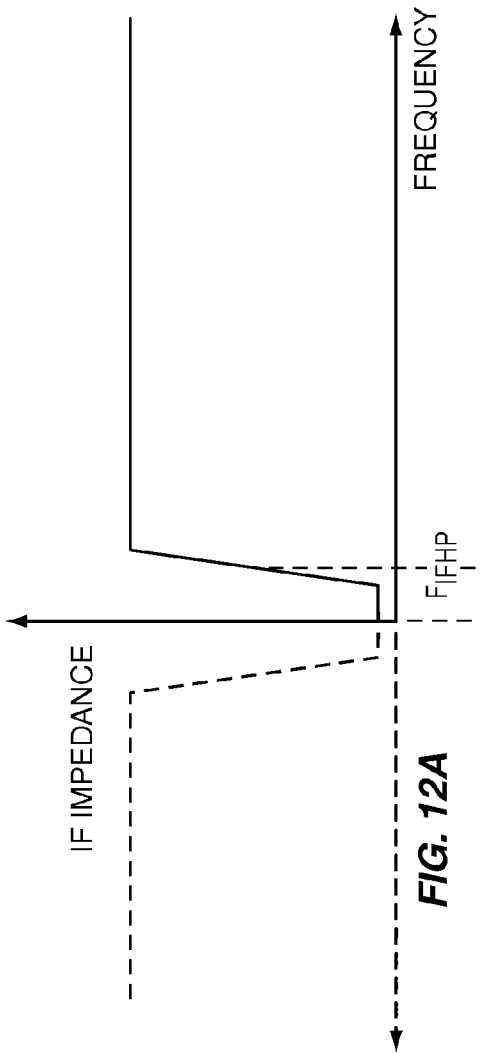

FIG. 12A is a graph showing the IF impedance of the IF impedance circuit when the present invention is used as an RF notch filter.

Figure 12B:
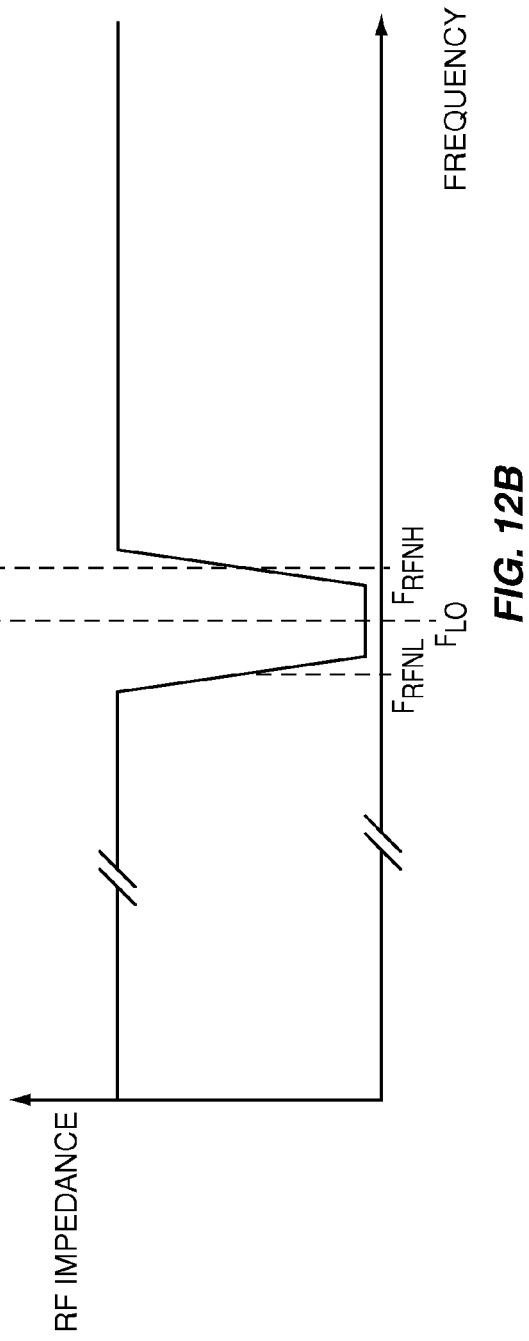

FIG. 12B is a graph showing the RF impedance, which is the translated IF impedance of the IF impedance circuit of FIG. 12A.

FIG. 13A is a graph showing the IF impedance of the IF impedance circuit when the present invention is used as an RF double notch filter.

FIG. 13B is a graph showing the RF impedance, which is the translated IF impedance of the IF impedance circuit of FIG. 13A.

Figure 14:
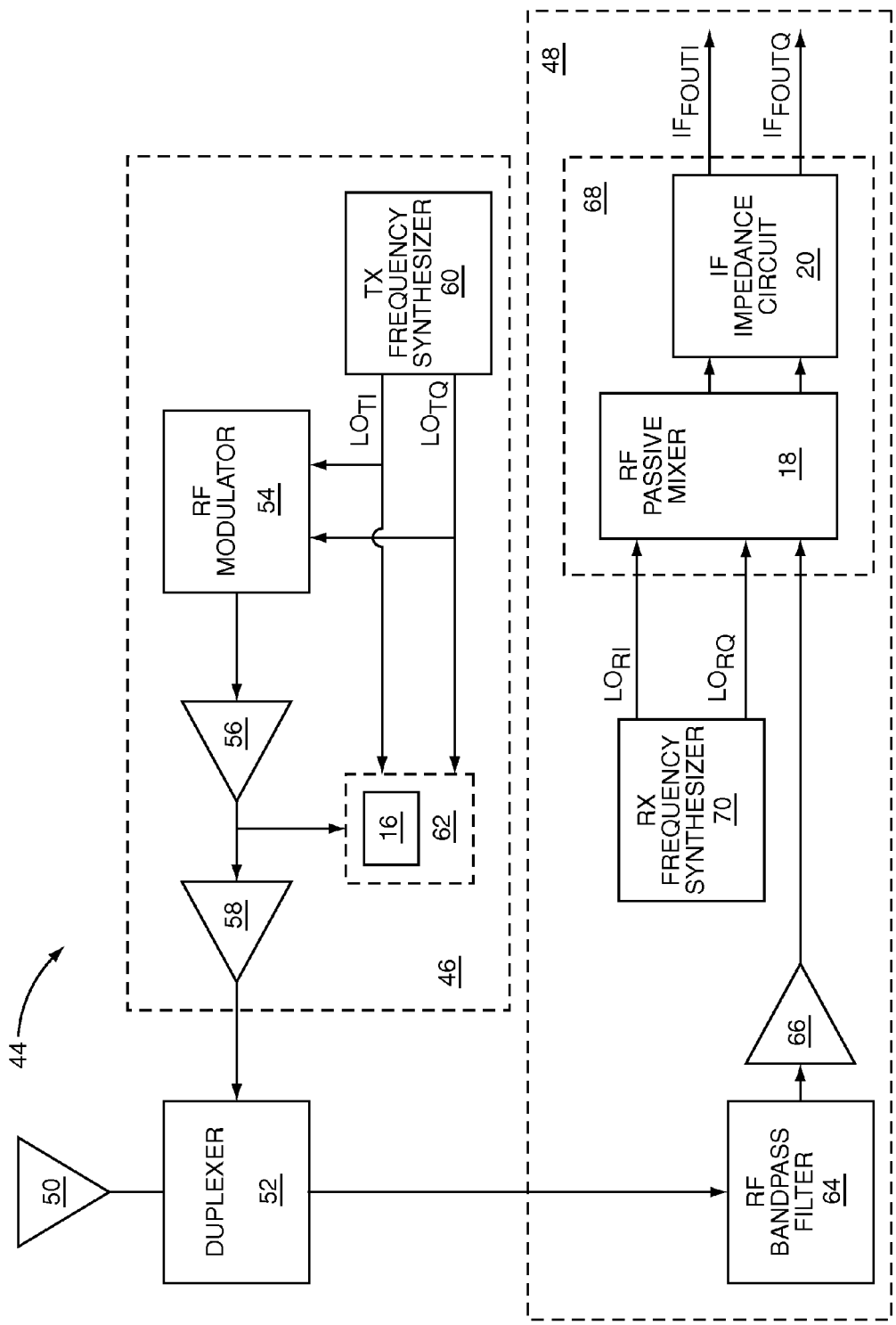

FIG. 14 shows the present invention used in a full duplex transceiver circuit.

Figure 15:
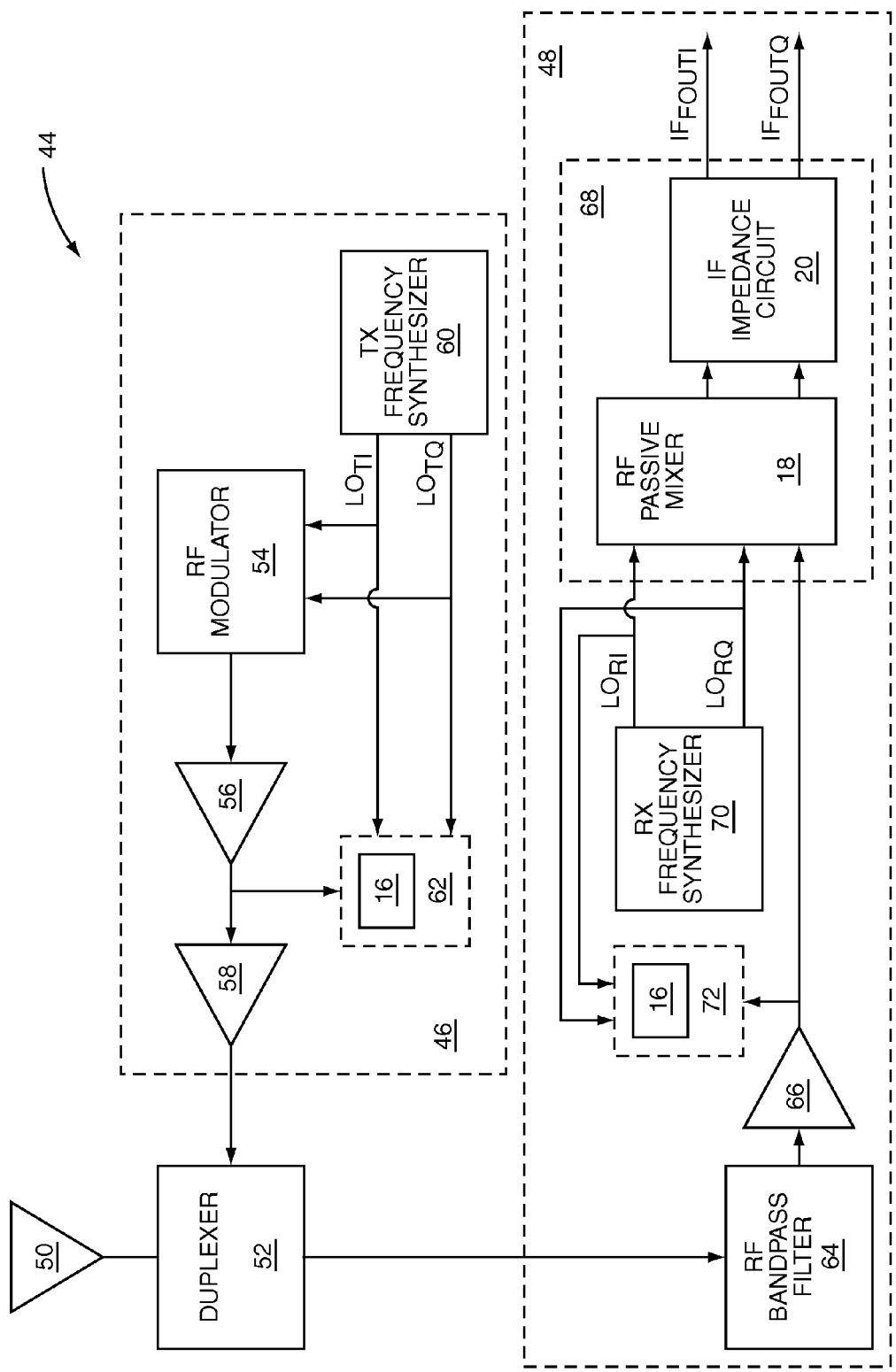

FIG. 15 adds an RF double notch filter to the full duplex transceiver circuit of FIG. 14.

Figure 16:
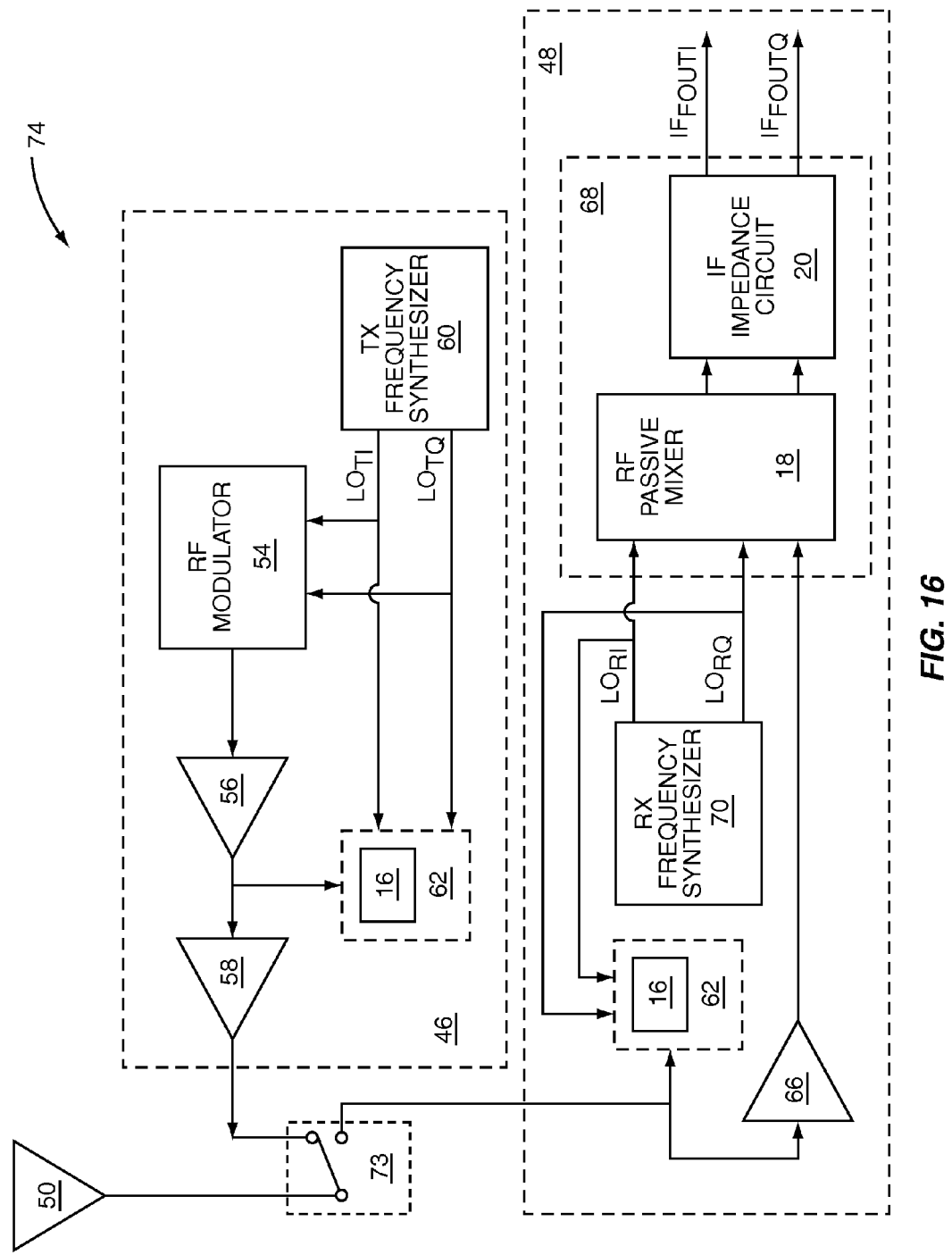

FIG. 16 shows the present invention used as a pre-low noise amplifier (LNA) bandpass filter in a half duplex transceiver circuit.

Figure 17:
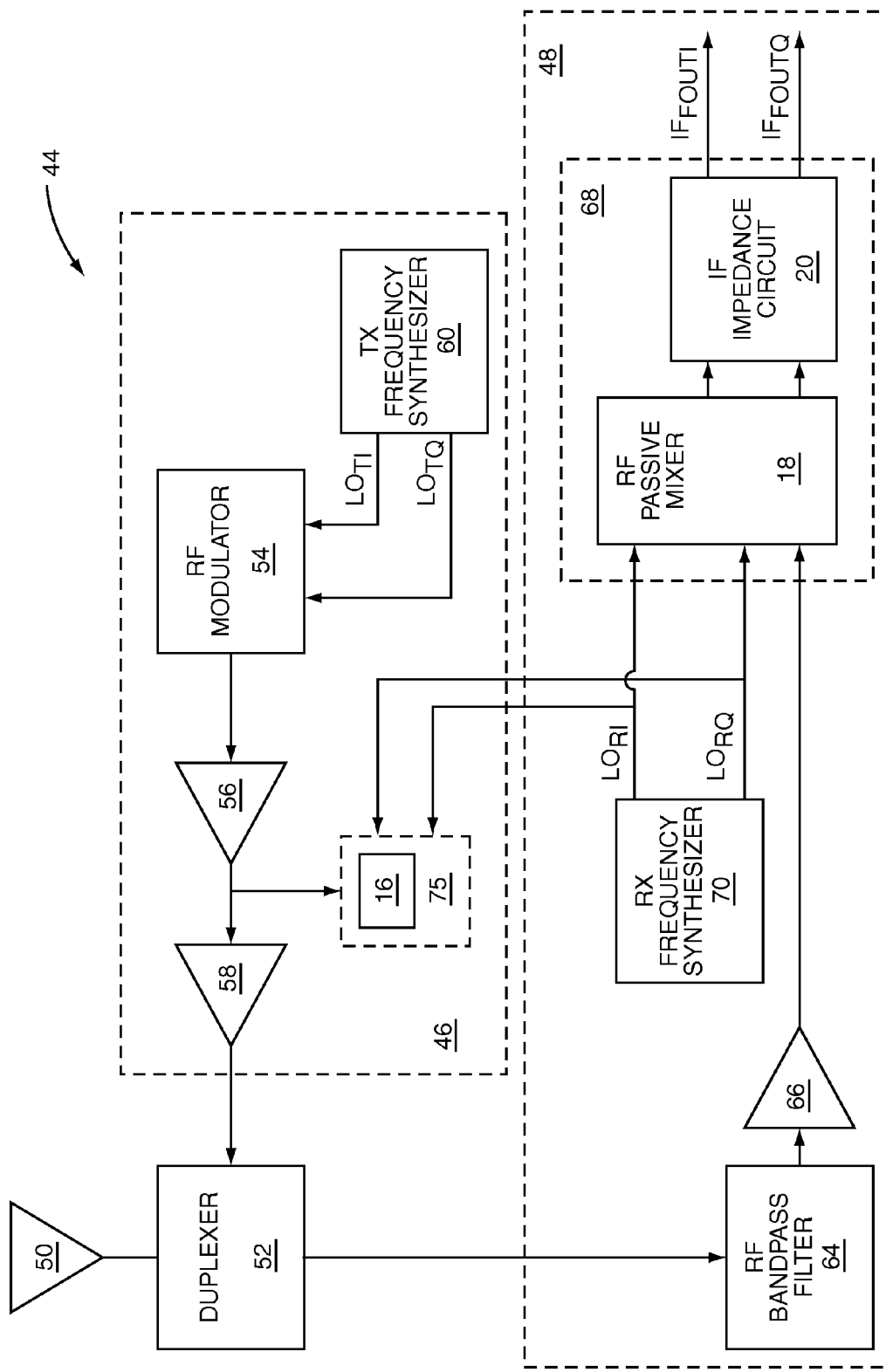

FIG. 17 adds an RF notch filter to the RF transmitter of FIG. 14.

Figure 18:
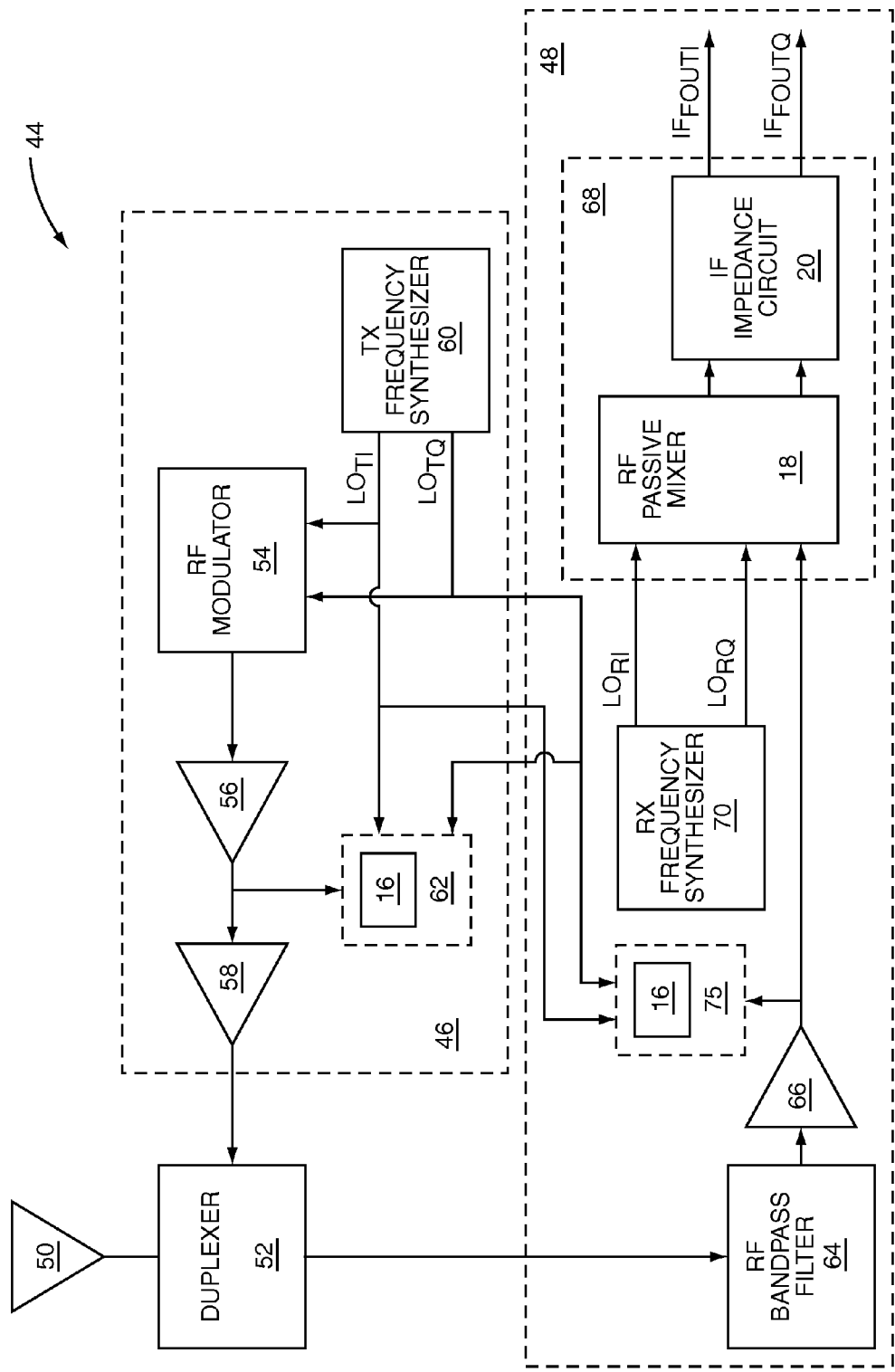

FIG. 18 adds the RF notch filter to the RF receiver of FIG. 14.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is an RF filter that translates impedances of an IF circuit to create a filter with an RF center frequency having the high Q roll-off characteristics of an IF filter. The RF filter is self-aligned with the frequency of an RF local oscillator. The RF filter has an impedance divider, which is formed by coupling an RF impedance circuit to a translated IF impedance circuit. The translated IF impedance circuit includes an RF passive mixer and an IF impedance circuit. The mixer translates the impedance of the IF impedance circuit by mixing an RF input signal with an RF local oscillator signal, which determines the RF center frequency. Both the magnitude and the frequency of the impedance may be translated. The magnitude of the impedance translation is dependent on the duty-cycle of the RF local oscillator. Filtered RF signals may be provided by the impedance divider; however, input impedances from downstream circuitry, such as an amplifier stage, will become part of the impedance divider and may influence RF filter behavior. Filtered IF signals may be provided by the IF impedance circuit.

To effectively translate and preserve the IF impedance characteristics, the IF impedance circuit presents a high impedance at harmonics of the RF local oscillator signal. The high impedance is typically greater than the impedance of the RF impedance circuit. The RF passive mixer may translate IF impedances into RF impedances at the frequency of the RF local oscillator signal, and at harmonics of the RF local oscillator signal; therefore, the IF impedance circuit presents high impedances at harmonics of the RF local oscillator signal; however, any impedances at harmonics of the RF local oscillator signal may affect the magnitude of translated impedances. Certain embodiments of the present invention may include series coupled inductive elements in the IF impedance circuit to provide the high impedances. Values of the inductive elements may be chosen to resonate with parasitic capacitances at harmonics of the RF local oscillator signal to maximize the high impedances at these specific frequencies.

Several different types of RF filters can be created using this technique, including but not limited to RF bandpass filters, RF notch filters, and RF double notch filters. Such filters could be used in RF transmitters, RF receivers, or both. By removing interfering signals in the RF section of an RF receiver instead of the IF section, the RF mixer is spared large amplitudes of interfering signals, which can significantly improve intermodulation performance, relax compression point requirements in the IF section, or both.

In certain embodiments of the present invention, the RF impedance circuit may be series coupled in an RF signal path, and the translated IF impedance circuit may be coupled to ground. Alternately, some embodiments of the present invention may couple the RF impedance circuit in parallel with the translated IF impedance circuit, which are then both driven from a current source. Filtered RF signals may be provided by the parallel coupling of the RF impedance circuit and the translated IF impedance circuit. Filtered IF signals may be provided by the IF impedance circuit.

The RF passive mixer and the IF impedance circuit may be quadrature to eliminate image load impedances creating image responses as a result of mixing. Any unused quadrature inputs may be grounded to ensure proper mixing and IF impedance translation behavior. RF signals, IF signals, or both may include differential signals. The RF passive mixer may be of any architecture that translates an IF impedance presented to an IF output of the RF passive mixer to an RF input impedance at an RF input of the RF passive mixer. The RF passive mixer may be a switching RF passive mixer, which uses the RF local oscillator signal to enable and disable switching elements between an RF input and an IF output. The RF impedance circuit may be provided by an output impedance of an RF amplifier that feeds the translated IF impedance circuit. An RF receiver may use the present invention to remove unwanted signals that have been received through an antenna, or signals from other circuitry, such as an RF transmitter. An RF receiver may use filtered IF signals from the IF impedance circuit. The filtered IF signals may be at any IF frequency, including but not limited to very low IF (VLIF) and direct current (DC) resulting from direct conversion. An RF transmitter may use the present invention to remove noise from a transmitted signal.

Figure 1:
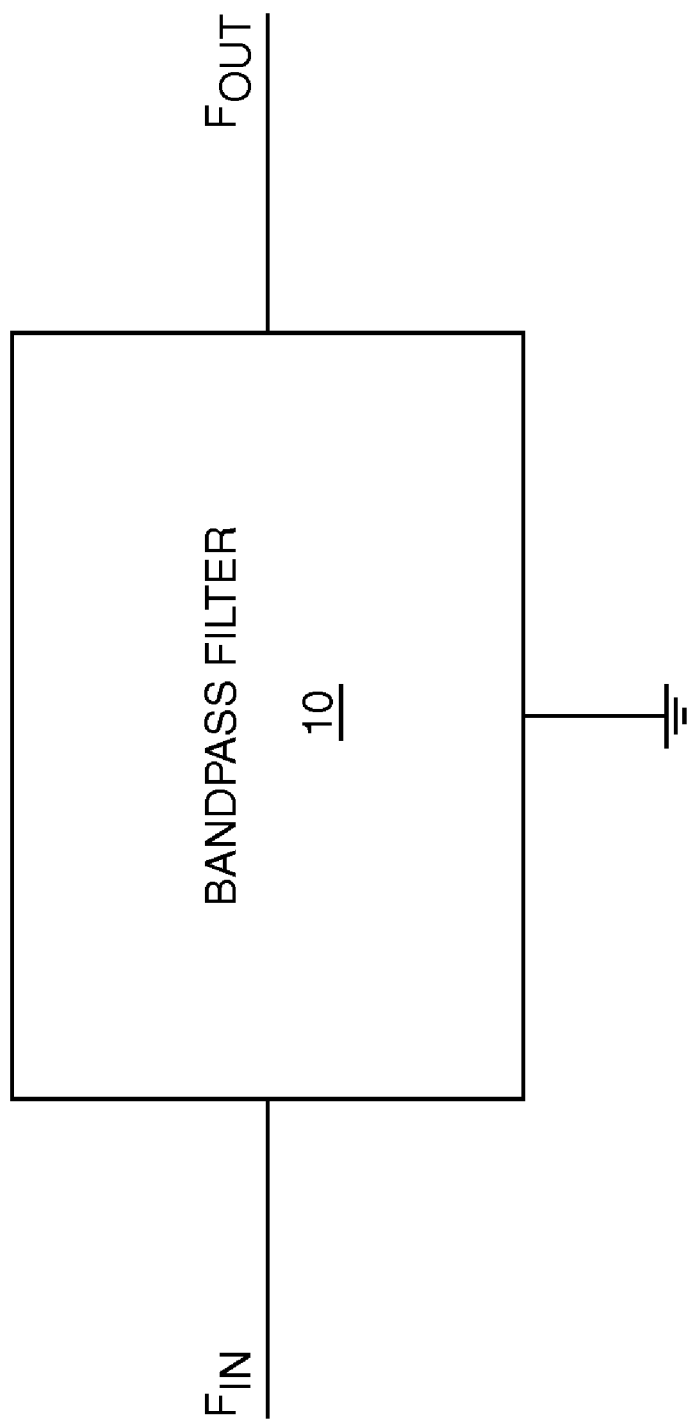
FIG. 1 shows a bandpass filter according to the prior art.
Figures 2A, 2B:
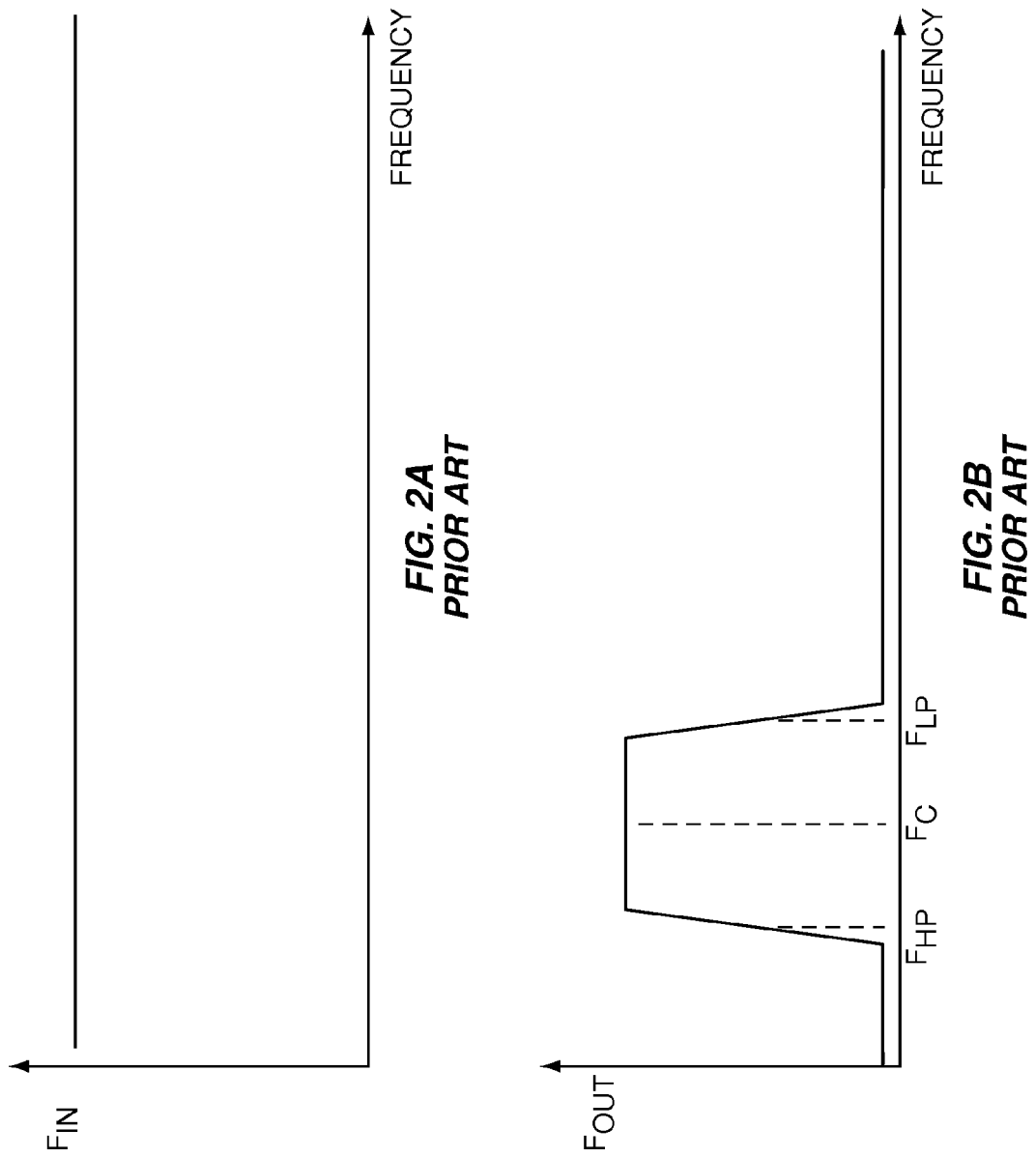
FIGS. 2A and 2B are graphs showing the frequency response of a SAW filter used as the bandpass filter of FIG. 1.
Figure 3A:
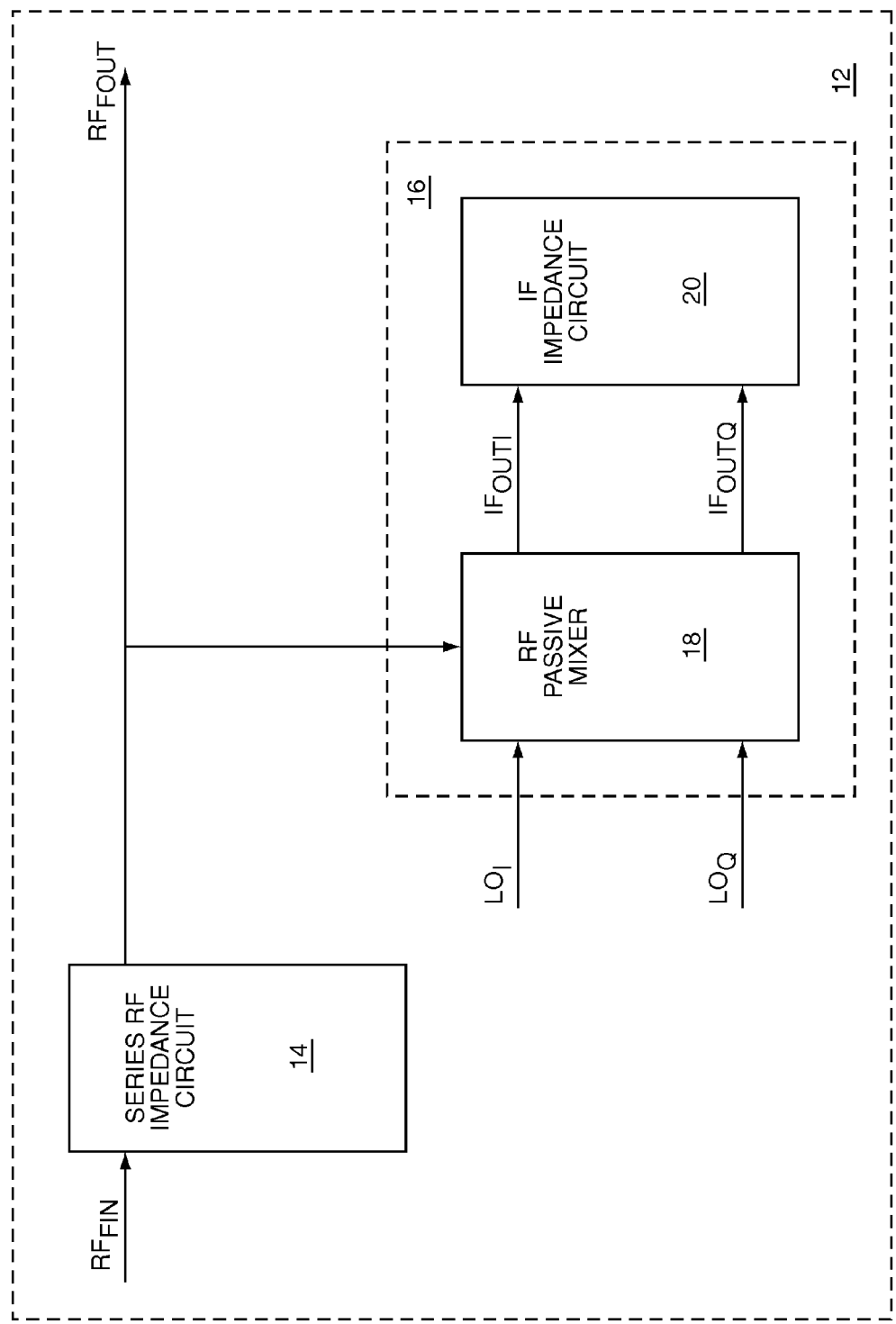
FIG. 3A shows one embodiment of the present invention, which is a series coupled RF filter using IF impedance translation.

FIG. 3A shows one embodiment of the present invention, which is an RF filter 12 using IF impedance translation. A series RF impedance circuit 14 receives input signals into an RF filter input $RF_{FIN}$. The series RF impedance circuit 14 is coupled to a translated IF impedance circuit 16 to form an RF impedance divider, which provides RF filtering behavior, and may provide an RF filter output $RF_{FOUT}$. The translated IF impedance circuit 16 includes an RF passive mixer 18, which feeds an IF impedance circuit 20. The RF passive mixer 18 receives quadrature local oscillator signals into an in-phase local oscillator input $LO_I$ and a quadrature-phase local oscillator input $LO_Q$. The RF passive mixer 18 mixes the quadrature local oscillator signals with an RF input signal from the series RF impedance circuit 14 to create IF output signals provided to an in-phase IF output $IF_{OUTI}$ and a quadrature-phase IF output $IF_{OUTQ}$. The IF outputs $IF_{OUTI}$, $IF_{OUTQ}$ are coupled to the IF impedance circuit 20, which presents IF impedances to the IF outputs $IF_{OUTI}$, $IF_{OUTQ}$ for translation into RF impedances. The response of the IF impedances to different frequencies determines the behavior of the RF filter 12. The mixing by the RF passive mixer 18 translates the impedances of the IF impedance circuit 20 into an RF impedance. The translation process creates a mirror of the IF impedances about an RF center frequency, which is equal to the frequency of the RF local oscillator signals. In general, signals at quadrature-phase inputs and outputs are phase-shifted approximately 90 degrees from signals at in-phase inputs and outputs.

Figure 3B:
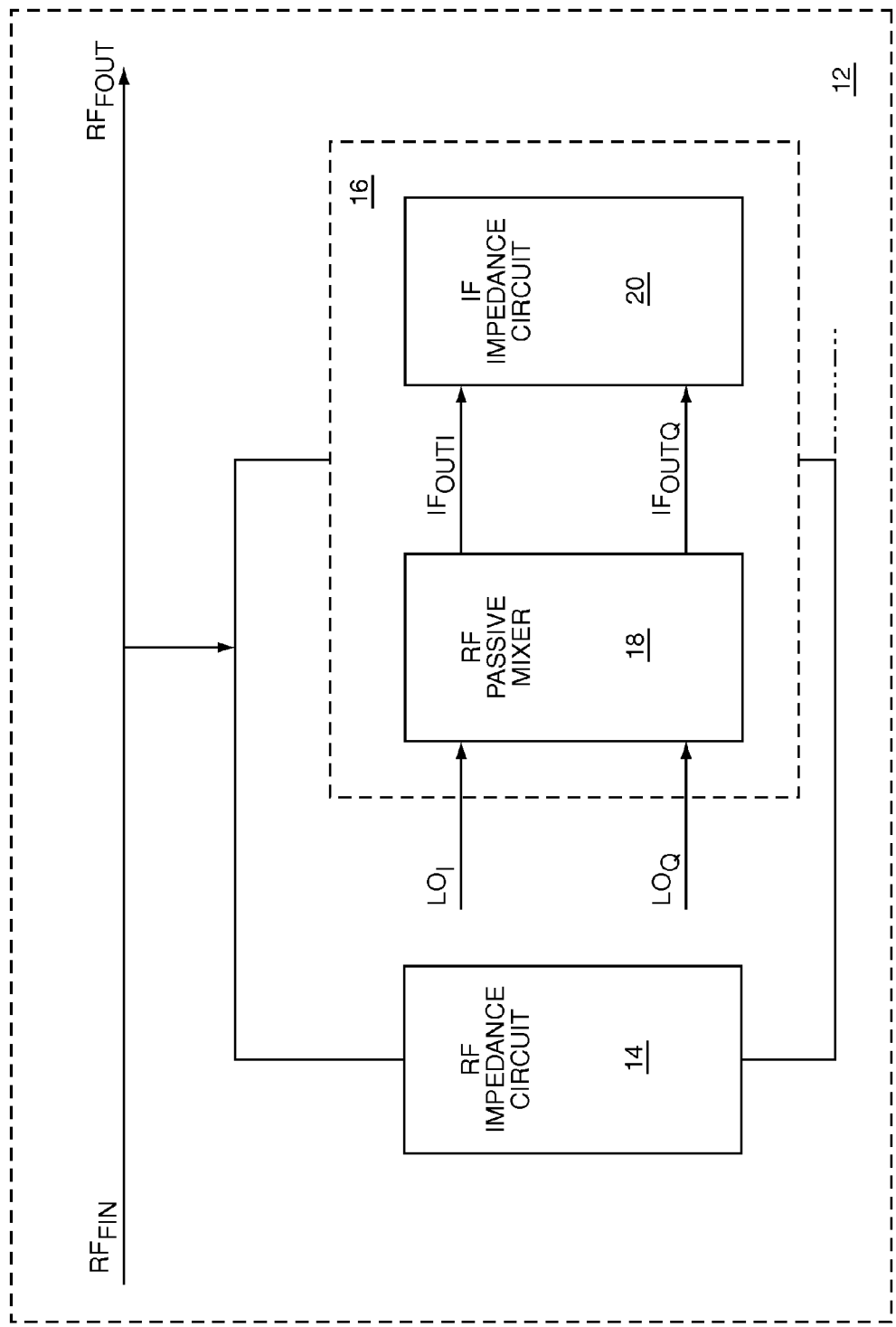
FIG. 3B shows an alternate embodiment of the present invention, which is a parallel coupled RF filter using IF impedance translation.

FIG. 3B shows an alternate embodiment of the present invention. The RF impedance circuit 14 receives input signals into an RF filter input $RF_{FIN}$. The RF impedance circuit 14 is coupled in parallel with the translated IF impedance circuit 16. Upstream circuitry provides input signals into the RF filter input $RF_{FIN}$. The upstream circuitry has a high output impedance; therefore, the RF filtering behavior is provided from the RF impedance circuit 14 that is coupled in parallel with the translated IF impedance circuit 16. An RF filter output $RF_{FOUT}$ may be provided by coupling to the RF filter input $RF_{FIN}$.

Figure 4:
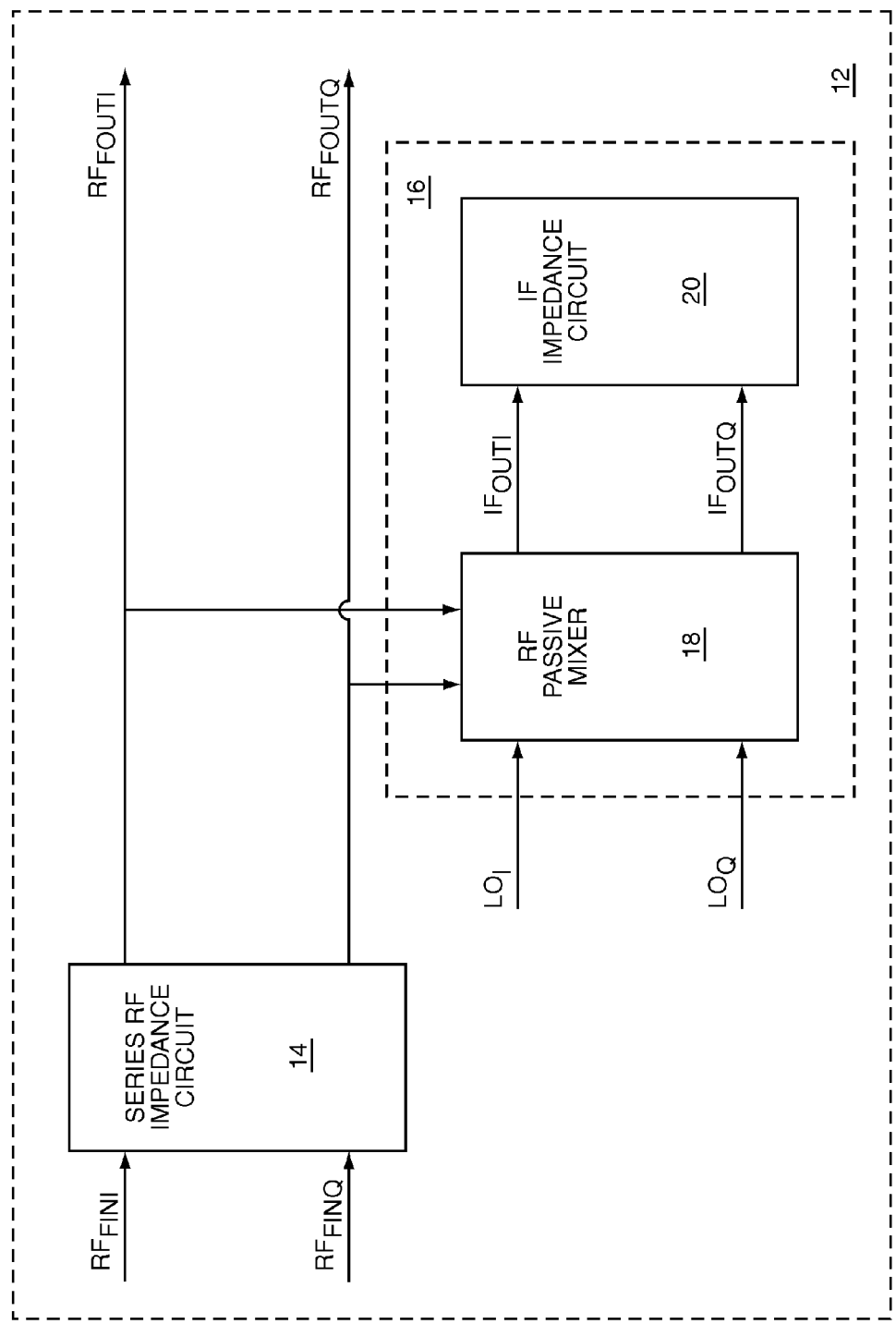
FIG. 4 shows the RF filter of FIG. 3A wherein the RF signal path is quadrature.

FIG. 4 differs from the RF filter 12 of FIG. 3A in that the RF signal path in FIG. 4 is quadrature. An in-phase RF input signal is received into an in-phase RF filter input $RF_{FINI}$ of the series RF impedance circuit 14. A quadrature-phase RF input signal is received into a quadrature-phase RF filter input $RF_{FINQ}$ of the series RF impedance circuit 14. The series RF impedance circuit 14 is coupled to the translated IF impedance circuit 16 to form the RF impedance divider, which provides RF filtering behavior, and may provide an in-phase RF filter output $RF_{FOUTI}$ and a quadrature-phase RF filter output $RF_{FOUTQ}$.

Figure 5:
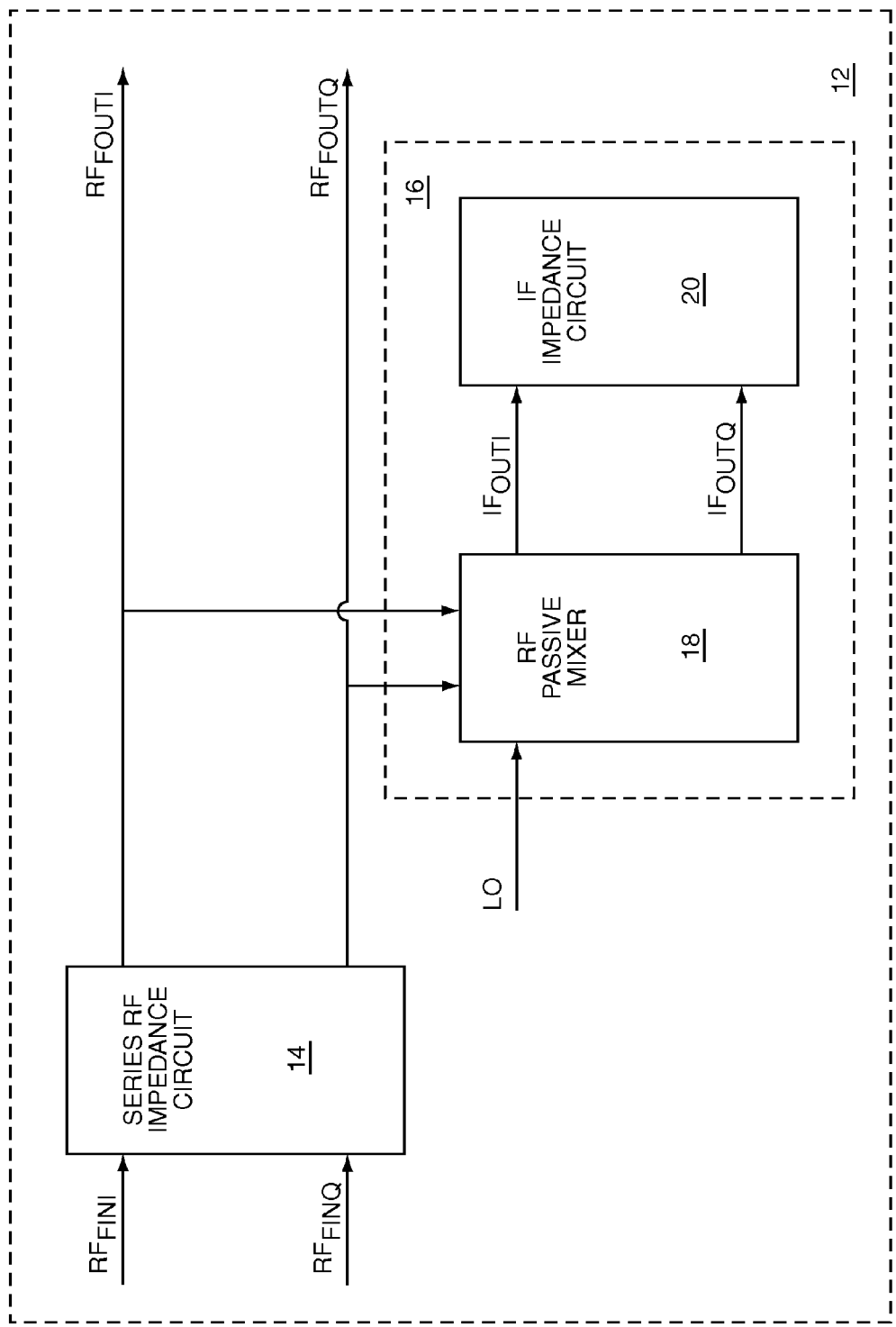
FIG. 5 shows the RF filter of FIG. 4 wherein the local oscillator signals are not quadrature.

FIG. 5 differs from the RF filter 12 of FIG. 4 in that the local oscillator signals in FIG. 5 are not quadrature. The RF passive mixer 18 receives a quadrature local oscillator signal into a single local oscillator input LO.

FIG. 6 differs from the RF filter 12 of FIG. 3A in that the RF filter output of FIG. 3A is taken from the output of the series RF impedance circuit 14, whereas in FIG. 6 there is no RF filter output; however, the IF impedance circuit 20 provides an in-phase filtered IF output $IF_{FOUTI}$ and a quadrature-phase filtered IF output $IF_{FOUTQ}$ to provide IF signals for processing by downstream receiver circuitry.

FIG. 7 adds differential signals to the RF filter 12 of FIG. 6. The series RF impedance circuit 14 receives differential input signals into a first differential RF filter input $RF_{FIN1}$ and a second differential RF filter input $RF_{FIN2}$. The series RF impedance circuit 14 is coupled to the translated IF impedance circuit 16 to form the RF impedance divider, which provides RF filtering behavior, and provides differential RF filter output signals to the translated IF impedance circuit 16 on a first differential RF filter output $RF_{FOUT1}$ and a second differential RF filter output $RF_{FOUT2}$. The RF passive mixer 18 receives differential quadrature local oscillator signals into a first differential in-phase local oscillator input $LO_{I1}$, a second differential in-phase local oscillator input $LO_{I2}$, a first differential quadrature-phase local oscillator input $LO_{Q1}$, and a second differential quadrature-phase local oscillator input $LO_{Q2}$. The RF passive mixer 18 mixes the differential quadrature local oscillator signals with the differential RF filter output signals to create differential IF output signals provided to a first differential in-phase IF output $IF_{OUTI1}$, a second differential in-phase IF output $IF_{OUTI2}$, a first differential quadrature-phase IF output $IF_{OUTQ1}$, and a second differential quadrature-phase IF output $IF_{OUTQ2}$. The differential IF outputs $IF_{OUTI1}$, $IF_{OUTI2}$, $IF_{OUTQ1}$, $IF_{OUTQ2}$ are coupled to the IF impedance circuit 20, which presents differential IF impedances to the differential IF outputs $IF_{OUTI1}$, $IF_{OUTI2}$, $IF_{OUTQ1}$, $IF_{OUTQ2}$ for translation into RF impedances. The IF impedance circuit 20 provides a first differential in-phase filtered IF output $IF_{FOUTI1}$, a second differential in-phase filtered IF output $IF_{FOUTI2}$, a first differential quadrature-phase filtered IF output $IF_{FOUTQ1}$, and a second differential quadrature-phase filtered IF output $IF_{FOUTQ2}$ to provide differential filtered IF signals for processing by downstream receiver circuitry. In general, first differential inputs and outputs are phase-shifted from second differential inputs and outputs by approximately 180 degrees.

FIG. 8 shows the series RF impedance circuit 14 being provided by a differential RF amplifier 22. The differential RF amplifier 22 receives differential input signals into a first differential input $RF_{IN1}$ and a second differential input $RF_{IN2}$. The differential RF amplifier 22 can be represented as having an ideal non-inverting amplifier 24 feeding a non-inverting output impedance R2, and an ideal inverting amplifier 26 feeding an inverting output impedance R3. The differential output impedances R2, R3 form the series RF impedance circuit 14.

FIG. 9 adds series inductors and capacitors to the IF impedance circuit 20 of FIG. 7. The series inductors provide high pass filtering to present high impedances at harmonics of the RF local oscillator signal. The series capacitors provide low pass filtering to present high impedances at low IF frequencies. The low pass filtering is translated into bandpass filtering by the RF passive mixer 18. A first inductor L1 is coupled to the first differential in-phase IF output $IF_{OUTI1}$. A first capacitor C1 and the input to a first buffer U1 are coupled to the first inductor L1. The first differential in-phase IF output $IF_{FOUTI1}$ is provided from the output of the first buffer U1. A second inductor L2 is coupled to the second differential in-phase IF output $IF_{OUTI2}$. A second capacitor C2 and the input to a second buffer U2 are coupled to the second inductor L2. The second differential in-phase IF output $IF_{FOUTI2}$ is provided from the output of the second buffer U2. A third inductor L3 is coupled to the first differential quadrature-phase IF output $IF_{OUTQ1}$. A third capacitor C3 and the input to a third buffer U3 are coupled to the third inductor L3. The first differential quadrature-phase IF output $IF_{FOUTQ1}$ is provided from the output of the third buffer U3. A fourth inductor L4 is coupled to the second differential quadrature-phase IF output $IF_{OUTQ2}$. A fourth capacitor C4 and the input to a fourth buffer U4 are coupled to the fourth inductor L4. The second differential quadrature-phase IF output $IF_{FOUTQ2}$ is provided from the output of the fourth buffer U4. Inductance values of the inductors L1, L2, L3, L4 may be chosen to resonate with any parasitic capacitances on the IF outputs $IF_{OUTI1}$, $IF_{OUTI2}$, $IF_{OUTQ1}$, $IF_{OUTQ2}$ of the RF passive mixer 18. Alternatively, capacitors may be added to the IF outputs $IF_{OUTI1}$, $IF_{OUTI2}$, $IF_{OUTQ1}$, $IF_{OUTQ2}$ to resonate with the inductors L1, L2, L3, L4, which provides a more deterministic resonant frequency than just relying on parasitic capacitance and enables the use of smaller inductors to save space and cost. Additionally, the values of the capacitors can be changed to match local oscillator frequency changes.

The resonant frequency may be around twice to three times the frequency of the local oscillator signals. A high impedance load is thus presented at the IF port at the second and other significant harmonics of the local oscillator signals; therefore, the component of the impedance observed at the RF port of the mixers due to the translated IF port impedances will be high. This means that the net impedance observed at the RF port will be the parallel equivalent of this high impedance with any other IF impedance translated in frequency by the RF passive mixer 18. Thus, the net impedance observed at the RF port can be made to follow the impedance at the IF port but scaled in magnitude and shifted in frequency by a factor of the frequency of the local oscillator signals. The magnitude scaling is a function of the duty cycle of the local oscillator signals and the magnitude of impedances at harmonics of the RF local oscillator signal. If the value of the inductors L1, L2, L3, L4 are not closely matched, then IF image impedances may be presented at harmonics of the RF local oscillator signal. In other embodiments of the present invention, the capacitors C1, C2, C3, C4, the buffers U1, U2, U3, U4, or both may be omitted.

FIG. 10 shows details of the RF passive mixer 18 of FIG. 7, which is a differential switching RF passive mixer using field effect transistors (FETs) as switching elements. The first differential RF filter output $RF_{FOUT1}$ is coupled to the drains of a first in-phase transistor 28, a second in-phase transistor 30, a first quadrature-phase transistor 32, and a second quadrature-phase transistor 34. The second differential RF filter output $RF_{FOUT2}$ is coupled to the drains of a third in-phase transistor 36, a fourth in-phase transistor 38, a third quadrature-phase transistor 40, and a fourth quadrature-phase transistor 42. The first differential in-phase local oscillator input $LO_{I1}$ is coupled to the gates of the first in-phase transistor 28 and the fourth in-phase transistor 38. The second differential in-phase local oscillator input $LO_{I2}$ is coupled to the gates of the third in-phase transistor 36 and the second in-phase transistor 30.

The first differential quadrature-phase local oscillator input $LO_{Q1}$ is coupled to the gates of the first quadrature-phase transistor 32 and the fourth quadrature-phase transistor 42. The second differential quadrature-phase local oscillator input $LO_{Q2}$ is coupled to the gates of the third quadrature-phase transistor 40 and the second quadrature-phase transistor 34. The first differential in-phase IF output $IF_{OUTI1}$ is coupled to the sources of the fourth in-phase transistor 38 and the second in-phase transistor 30. The second differential in-phase IF output $IF_{OUTI2}$ is coupled to the sources of the first in-phase transistor 28 and the third in-phase transistor 36. The first differential quadrature-phase IF output $IF_{OUTQ1}$ is coupled to the sources of the fourth quadrature-phase transistor 42 and the second quadrature-phase transistor 34. The second differential quadrature-phase IF output $IF_{OUTQ2}$ is coupled to the sources of the first quadrature-phase transistor 32 and the third quadrature-phase transistor 40.

FIG. 11A is a graph showing the IF impedance of the IF impedance circuit 20 when the present invention is used as an RF bandpass filter. The IF impedance is a low pass filter, which passes frequencies from DC to an IF low pass break frequency $F_{IFLP}$, and blocks frequencies from the IF low pass break frequency $F_{IFLP}$ to an IF harmonic blocking break frequency $F_{IFHM}$. Frequencies above the IF harmonic blocking break frequency $F_{IFHM}$ are passed to present high impedances at harmonics of the RF local oscillator signals.

FIG. 11B is a graph showing the RF impedance, which is the translated IF impedance of the IF impedance circuit 20 of FIG. 11A. When the IF impedance is translated into the RF impedance, a mirror image of the IF impedance is created that is centered about the frequency of the RF local oscillator signals $F_{LO}$. The shape of the RF impedance response graph is very similar to the shape of the IF impedance response graph. Finite switch resistances, resonances, and loading at the RF inputs to the RF passive mixer and the effects of IF port impedances at harmonics of the local oscillator signals may affect the shape of the RF impedance response graph. An RF low pass break frequency $F_{RFLP}$ is located at $F_{LO}+F_{IFLP}$. An RF high pass break frequency $F_{RFHP}$ is located at $F_{LO}-F_{IFLP}$. An RF harmonic blocking break frequency $F_{RFHM}$ is located at $F_{LO}+F_{IFHM}$. Frequencies above the RF harmonic blocking break frequency $F_{RFHM}$ are passed to present high impedances at harmonics of the RF local oscillator signals. The low pass side of the filter and the high pass side of the filter combine to form the bandpass filter. The bandwidth of the bandpass filter is equal to approximately $2*F_{IFLP}$.

FIG. 12A is a graph showing the IF impedance of the IF impedance circuit 20 when the present invention is used as an RF notch filter. The IF impedance is a high pass filter, which blocks frequencies from DC to an IF high pass break frequency $F_{IFHP}$, and passes frequencies above the IF high pass break frequency $F_{IFHP}$.

FIG. 12B is a graph showing the RF impedance, which is the translated IF impedance of the IF impedance circuit 20 of FIG. 12A. When the IF impedance is translated into the RF impedance, a mirror image of the IF impedance is created that is centered about the frequency of the RF local oscillator signals $F_{LO}$. The shape of the RF impedance response graph is identical to the shape of the IF impedance response graph. An RF low notch break frequency $F_{RFNL}$ is located at $F_{LO}-F_{IFHP}$. An RF high notch break frequency $F_{RFNH}$ is located at $F_{LO}+F_{IFHP}$. The low notch side of the filter and the high notch side of the filter combine to form the notch filter. The bandwidth of the notch filter is equal to approximately $2*F_{IFHP}$.

FIG. 13A is a graph showing the IF impedance of the IF impedance circuit 20 when the present invention is used as an RF double notch filter. The IF impedance is a notch filter, which blocks at an IF notch frequency $F_{IFN}$, which may be determined by a series resonant circuit. The bandwidth of the notch filter may be determined by the Q of the series resonant circuit.

FIG. 13B is a graph showing the RF impedance, which is the translated IF impedance of the IF impedance circuit 20 of FIG. 13A. When the IF impedance is translated into the RF impedance, a mirror image of the IF impedance is created that is centered about the frequency of the RF local oscillator signals $F_{LO}$. The shape of the RF impedance response graph is identical to the shape of the IF impedance response graph. An RF low double notch frequency $F_{RFDNL}$ is located at $F_{LO}-F_{IFN}$. An RF high double notch frequency $F_{RFDNH}$ is located at $F_{LO}+F_{IFN}$.

FIG. 14 shows the present invention used in a full duplex transceiver circuit 44, which includes an RF transmitter 46 and an RF receiver 48. The RF transmitter and receiver 46, 48 are coupled to an RF antenna 50 through an RF duplexer 52. The RF transmitter 46 includes an RF modulator 54, which feeds an RF driver stage 56. The RF driver stage 56 feeds an RF final stage 58, which feeds the RF duplexer 52. A transmitter frequency synthesizer 60 provides a transmitter in-phase local oscillator signal $LO_{TI}$ and a transmitter quadrature-phase local oscillator signal $LO_{TQ}$ to the RF modulator 54 and a bandpass shunt impedance circuit 62. The bandpass shunt impedance circuit 62 includes a version of the translated IF impedance circuit 16 that provides bandpass functionality. The bandpass shunt impedance circuit 62 and the output impedance of the RF driver stage 56 form a transmitter RF bandpass filter, which is used to reduce transmitter noise outside the passband of the transmitter RF bandpass filter. Since the center frequency of the transmitter RF bandpass filter is self-aligned to the transmitter local oscillator signals $LO_{TI}$, $LO_{TQ}$, the transmitter RF bandpass filter may be tuned to pass signals from different frequency bands. In a different embodiment of the present invention, the local oscillator signals to the bandpass shunt impedance circuit 62 may be provided from a source other than the transmitter frequency synthesizer 60.

The RF receiver 48 includes a first receiver RF bandpass filter 64, which receives RF signals from the RF duplexer 52. The RF receiver 48 feeds an LNA 66, which feeds an RF bandpass filter and down converter 68. A receiver frequency synthesizer 70 provides a receiver in-phase local oscillator signal $LO_{RI}$ and a transmitter quadrature-phase local oscillator signal $LO_{RQ}$ to the RF bandpass filter and down converter 68, which includes the RF passive mixer 18 and a version of the translated IF impedance circuit 16 that provides bandpass functionality and provides the filtered IF outputs $IF_{FOUTI}$, $IF_{FOUTQ}$. The RF bandpass filter and down converter 68 and the output impedance of the LNA 66 form a second receiver RF bandpass filter, which is used to reject received interfering signals and RF transmitter signals outside the passband of the second receiver RF bandpass filter.

FIG. 15 adds an RF double notch impedance circuit 72 to the full duplex transceiver circuit 44 of FIG. 14. The LNA 66 feeds the RF double notch impedance circuit 72, which includes a version of the translated IF impedance circuit 16 that provides double notch filter functionality. The receiver frequency synthesizer 70 provides the receiver local oscillator signals $LO_{RI}$, $LO_{RQ}$ to the RF double notch impedance circuit 72. The RF double notch impedance circuit 72 and the output impedance of the LNA 66 form an RF double notch filter. One of the notches of the RF double notch filter is at the transmitter frequency; therefore, the RF double notch filter is used to reject RF transmitter signals from the RF duplexer 52 or other sources. Since the center frequency of the RF double notch filter is self-aligned to the receiver local oscillator signals $LO_{RI}$, $LO_{RQ}$, the RF double notch filter may be tuned to receive signals from different frequency bands. In a different embodiment of the present invention, the local oscillator signals to the RF double notch impedance circuit 72 may be provided from a source other than the receiver frequency synthesizer 70.

FIG. 16 shows the present invention used as a pre-LNA bandpass filter in a half duplex transceiver circuit 74. Instead of being coupled to the RF antenna 50 through the RF duplexer 52, the RF transmitter and receiver 46, 48 are coupled to the RF antenna 50 through an RF switch 73. The bandpass shunt impedance circuit 62 and the output impedance of the RF antenna 50 form a pre-LNA RF bandpass filter, which is used to remove received signals and noise outside the passband of the pre-LNA RF bandpass filter. The receiver frequency synthesizer 70 provides the receiver local oscillator signals $LO_{RI}$, $LO_{RQ}$ to the bandpass shunt impedance circuit 62. Since the center frequency of the pre-LNA RF bandpass filter is self-aligned to the receiver local oscillator signals $LO_{RI}$, $LO_{RQ}$, the pre-LNA RF bandpass filter may be tuned to receive signals from different frequency bands. In a different embodiment of the present invention, the local oscillator signals to the bandpass shunt impedance circuit 62 may be provided from a source other than the receiver frequency synthesizer 70. The pre-LNA RF bandpass filter may be used in a receive only system that does not have the RF transmitter 46 and the RF switch 73. In such a system, the RF receiver 48 is coupled directly to the RF antenna 50.

FIG. 17 replaces the bandpass shunt impedance circuit 62 of FIG. 14 with an RF notch impedance circuit 75. The RF driver stage 56 feeds the RF notch impedance circuit 75, which includes a version of the translated IF impedance circuit 16 that provides notch filter functionality. The receiver frequency synthesizer 70 provides the receiver local oscillator signals $LO_{RI}$, $LO_{RQ}$ to the RF notch impedance circuit 75. The RF notch impedance circuit 75 and the output impedance of the RF driver stage 56 form a transmitter RF notch filter. The notch of the transmitter RF notch filter is at the receiver frequency; therefore, the transmitter RF notch filter is used to remove RF transmitter signals that may interfere with the RF receiver 48. Since the center frequency of the transmitter RF notch filter is self-aligned to the receiver local oscillator signals $LO_{RI}$, $LO_{RQ}$, the transmitter RF notch filter may be tuned to remove noise signals from different receiver frequency bands. In a different embodiment of the present invention, the local oscillator signals to the RF notch impedance circuit 75 may be provided from a source other than the receiver frequency synthesizer 70.

FIG. 18 adds the RF notch impedance circuit 75 to the RF receiver 48 of FIG. 14. The LNA 66 feeds the RF notch impedance circuit 75. The transmitter frequency synthesizer 60 provides the transmitter local oscillator signals $LO_{TI}$, $LO_{TQ}$ to the RF notch impedance circuit 75. The RF notch impedance circuit 75 and the output impedance of the LNA 66 form a receiver RF notch filter. The notch of the receiver RF notch filter is at the transmitter frequency; therefore, the receiver RF notch filter is used to remove RF transmitter signals that may interfere with the RF receiver 48. Since the center frequency of the receiver RF notch filter is self-aligned to the transmitter local oscillator signals $LO_{TI}$, $LO_{TQ}$, the receiver RF notch filter may be tuned to remove noise signals from different transmitter frequency bands. In a different embodiment of the present invention, the local oscillator signals to the RF notch impedance circuit 75 may be provided from a source other than the transmitter frequency synthesizer 60.

Those skilled in the art will recognize improvements and modifications to the preferred embodiments of the present invention. All such improvements and modifications are considered within the scope of the concepts disclosed herein and the claims that follow.

What is claimed is:

1. A radio frequency (RF) filter comprising:
  an RF impedance circuit having a first RF impedance adapted to receive an RF input signal, wherein the RF impedance circuit comprises an RF output;
  an intermediate frequency (IF) impedance circuit comprising an IF input having an IF input impedance, wherein a magnitude of the IF input impedance is greater than a magnitude of the first RF impedance at frequencies that are at least one of a group consisting of a second harmonic and a fourth harmonic of a local oscillator frequency; and
  an RF passive mixer comprising:
    an RF input having an RF input impedance, wherein the RF input is coupled to the RF output to provide a filtered RF signal;

a local oscillator input adapted to receive a local oscillator signal having the local oscillator frequency; and an IF output coupled to the IF input, wherein the IF input impedance is presented to the IF output, and the IF input impedance is translated into the RF input impedance by mixing the local oscillator signal with the filtered RF signal, wherein the first RF impedance and the RF input impedance form an impedance divider to create the filtered RF signal based on the RF input signal.

2. The RF filter of claim 1 wherein the IF output further comprises an in-phase IF output and a quadrature-phase IF output.

3. The RF filter of claim 2 wherein the local oscillator signal further comprises an in-phase local oscillator signal and a quadrature-phase local oscillator signal, wherein the quadrature-phase local oscillator signal is phase-shifted from the in-phase local oscillator signal by approximately 90 degrees.

4. The RF filter of claim 3 wherein:
the RF input further consists of a first differential RF input and a second differential RF input;
the in-phase IF output further consists of a first differential in-phase IF output and a second differential in-phase IF output; and
the quadrature-phase IF output further consists of a first differential quadrature-phase IF output and a second differential quadrature-phase IF output.

5. The RF filter of claim 2 wherein:
the IF input further comprises:
an in-phase IF input coupled to the in-phase IF output; and
a quadrature-phase IF input coupled to the quadrature-phase IF output; and
the IF impedance circuit further comprises a first inductive element coupled to the in-phase input, and a second inductive element coupled to the quadrature-phase input.

6. The RF filter of claim 1 wherein the RF input further comprises an in-phase RF input and a quadrature-phase RF input.

7. The RF filter of claim 1 further comprising a filtered RF output signal based on the filtered RF signal.

8. The RF filter of claim 1 wherein the IF output is adapted to provide a filtered IF output signal based on the filtered RF signal.

9. The RF filter of claim 1 wherein the RF impedance circuit further comprises an output impedance of an RF amplifier.

10. The RF filter of claim 1 wherein the RF passive mixer further comprises at least one switching element, wherein the at least one switching element is controlled by the local oscillator signal.

11. The RF filter of claim 1 wherein:
the first RF impedance has a first magnitude at a frequency equal to a sum of the local oscillator frequency and an IF cut-off frequency; and
a magnitude of the IF input impedance is:
greater than the first magnitude at frequencies below one-half times the IF cut-off frequency;
less than the first magnitude at frequencies above two times the IF cut-off frequency and below one-half times an RF cut-off frequency; and
greater than the first magnitude at frequencies above the RF cut-off frequency.

12. The RF filter of claim 11 wherein the RF filter is part of an RF transmitter, wherein the local oscillator frequency is approximately equal to a center frequency of the RF transmitter.

13. The RF filter of claim 11 wherein the RF filter is part of an RF receiver, wherein the local oscillator frequency is approximately equal to a center frequency of the RF receiver.

14. The RF filter of claim 13 wherein the IF output is adapted to provide a filtered IF output signal based on the filtered RF signal.

15. The RF filter of claim 13 wherein the RF impedance circuit further comprises an antenna circuit.

16. The RF filter of claim 1 wherein:
the first RF impedance has a first magnitude at a frequency equal to a sum of the local oscillator frequency and an IF cut-off frequency; and
a magnitude of the IF input impedance is:
less than the first magnitude at frequencies below one-half times the IF cut-off frequency; and
greater than the first magnitude at frequencies above two times the IF cut-off frequency.

17. The RF filter of claim 16 wherein:
the RF filter is used in an RF transmitter that is part of an RF transceiver, wherein the RF transceiver also comprises an RF receiver; and
the local oscillator frequency is approximately equal to a center frequency of the RF receiver.

18. The RF filter of claim 16 wherein:
the RF filter is used in an RF receiver that is part of an RF transceiver, wherein the RF transceiver also comprises an RF transmitter; and
the local oscillator frequency is approximately equal to a center frequency of the RF transmitter.

19. The RF filter of claim 1 wherein the RF input signal is provided to the RF output from an RF current source.

20. A method comprising:
presenting an intermediate frequency (IF) impedance to a radio frequency (RF) passive mixer;
providing a local oscillator signal to the RF passive mixer, wherein the local oscillator signal is at a local oscillator frequency;
translating the IF impedance to an RF impedance by mixing the local oscillator signal with a filtered RF signal;
providing the filtered RF signal from an RF impedance circuit, which is coupled to the RF passive mixer, wherein an impedance presented by the RF impedance circuit and the RF impedance form an impedance divider to create the filtered RF signal based on an RF input signal,
wherein a magnitude of the RF impedance is greater than a magnitude of the impedance presented by the RF impedance circuit at frequencies that are harmonics of the local oscillator frequency.

* * * * *